(12) United States Patent
Jung et al.

(10) Patent No.: US 10,419,646 B2
(45) Date of Patent: Sep. 17, 2019

(54) GAMMA SETTING SYSTEM OF DISPLAY DEVICE AND GAMMA SETTING METHOD THEREOF

(71) Applicant: Tae-Bo Jung, Daejeon (KR)

(72) Inventors: Tae-Bo Jung, Daejeon (KR);
Byung-Seong Bae, Suwon-si (KR);
Don-Sam Choi, Goyang-si (KR)

(73) Assignee: Jumi Lim, Gyeong Sang Nam-Do, Changyeong (KR)

( * ) Notice: Subject to any disclaimer, the term of this patent is extended or adjusted under 35 U.S.C. 154(b) by 311 days.

(21) Appl. No.: 15/501,102

(22) PCT Filed: Aug. 3, 2015

(86) PCT No.: PCT/KR2015/008096
§ 371 (c)(1),
(2) Date: Feb. 1, 2017

(87) PCT Pub. No.: WO2016/021896
PCT Pub. Date: Nov. 2, 2016

(65) Prior Publication Data
US 2017/0223233 A1    Aug. 3, 2017

(30) Foreign Application Priority Data

Aug. 4, 2014  (KR) ........................ 10-2014-0099898

(51) Int. Cl.
*H04N 5/202*  (2006.01)
*H04N 5/57*   (2006.01)
(Continued)

(52) U.S. Cl.
CPC ............. *H04N 5/202* (2013.01); *G09G 3/006* (2013.01); *G09G 3/3208* (2013.01); *H04N 5/57* (2013.01);
(Continued)

(58) Field of Classification Search
CPC combination set(s) only.
See application file for complete search history.

(56) References Cited

U.S. PATENT DOCUMENTS

2002/0186230 A1* 12/2002 Kudo ................... G09G 3/3607
345/690
2008/0024476 A1*  1/2008 Choi ..................... G02F 1/1362
345/207
(Continued)

FOREIGN PATENT DOCUMENTS

JP    2013-085062 A    5/2013
KR   20-1999-0025691 U  7/1999

OTHER PUBLICATIONS

PCT/KR2015/008096, dated Oct. 22, 2015, International Search Report and Written Opinion.
(Continued)

*Primary Examiner* — Tsung Yin Tsai

(57) ABSTRACT

The present invention provides a gamma setting system for a display device including: an optical measuring unit measuring an optical property of a display device including an emissive display panel having red, green and blue sub-pixels; a control center performing a null setting step and an automatic setting step using the optical property of the display device; a system driving unit transmitting a result data between the display device and the control center; a first display unit displaying a TW target luminance, a TW target chromaticity and an RGB inherent chromaticity registered for the null setting step and the automatic setting step, a graph of a gray level voltage and a luminance of an RGB and a TW with respect to a gray level, a high level cell driving voltage (PVDD) and a low level cell driving voltage (PVEE) applied to an emitting element, a high level gamma source voltage (VDDH) and a low level gamma source voltage (VDDL) applied to a driving IC, a gamma slope, a contrast (Continued)

ratio, a driving type of the system, a gamma setting, an instruction on an execution command, and a progress state of the display device.

49 Claims, 10 Drawing Sheets

(51) Int. Cl.
    *G09G 3/00*         (2006.01)
    *G09G 3/3208*     (2016.01)
    *H04N 17/02*     (2006.01)
    *H04N 17/04*     (2006.01)
    *G09G 5/10*       (2006.01)
    *G09G 5/02*       (2006.01)

(52) U.S. Cl.
    CPC .............. *H04N 17/02* (2013.01); *H04N 17/04* (2013.01); *G09G 5/02* (2013.01); *G09G 5/10* (2013.01); *G09G 2310/0221* (2013.01); *G09G 2320/0673* (2013.01); *G09G 2320/0693* (2013.01)

(56) References Cited

U.S. PATENT DOCUMENTS

| | | | |
|---|---|---|---|
| 2011/0007102 A1* | 1/2011 | Ogura | G09G 3/3233 345/690 |
| 2011/0050749 A1* | 3/2011 | Park | G09G 3/20 345/690 |
| 2011/0199395 A1* | 8/2011 | Nathan | G09G 3/3241 345/690 |
| 2013/0120659 A1* | 5/2013 | Park | G06T 5/001 348/674 |
| 2013/0135272 A1 | 5/2013 | Park | |

OTHER PUBLICATIONS

International Search Report and Written Opinion dated Oct. 22, 2015 in connection with PCT/KR2015/008096.

\* cited by examiner

[Fig. 1]
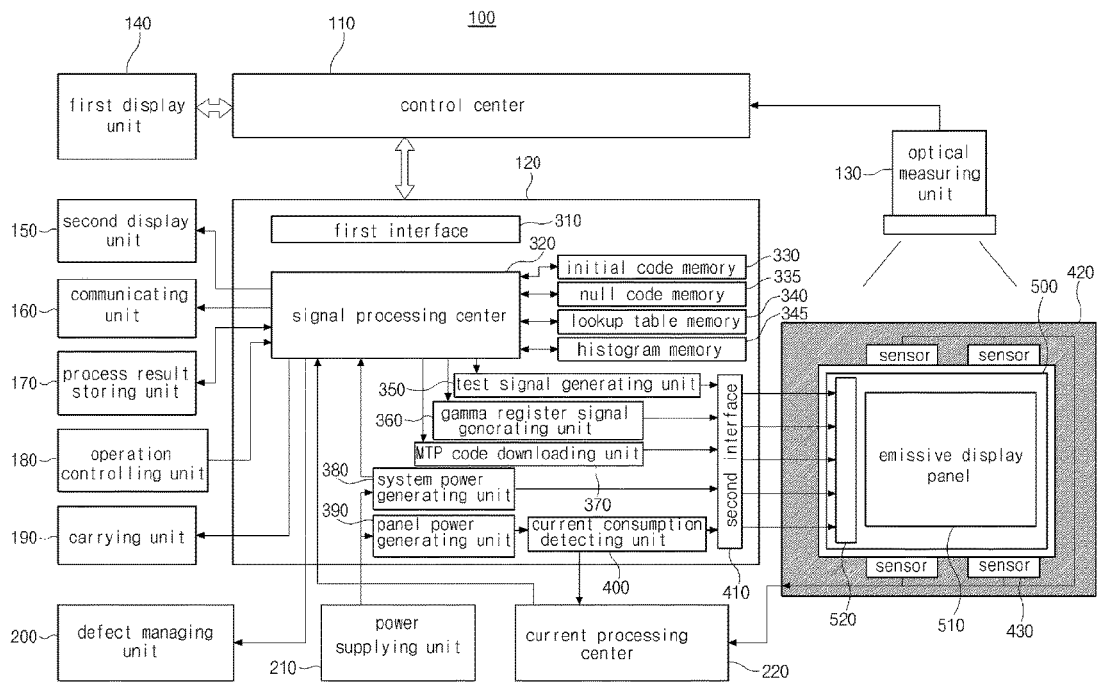
[Fig. 2]
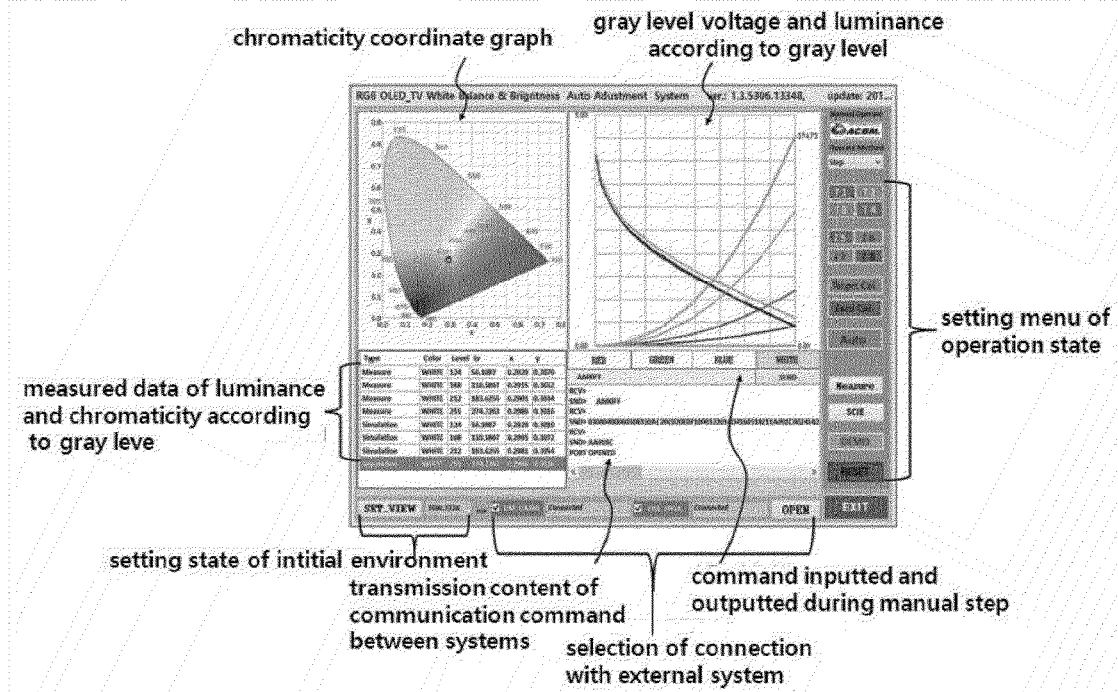

[Fig. 5]
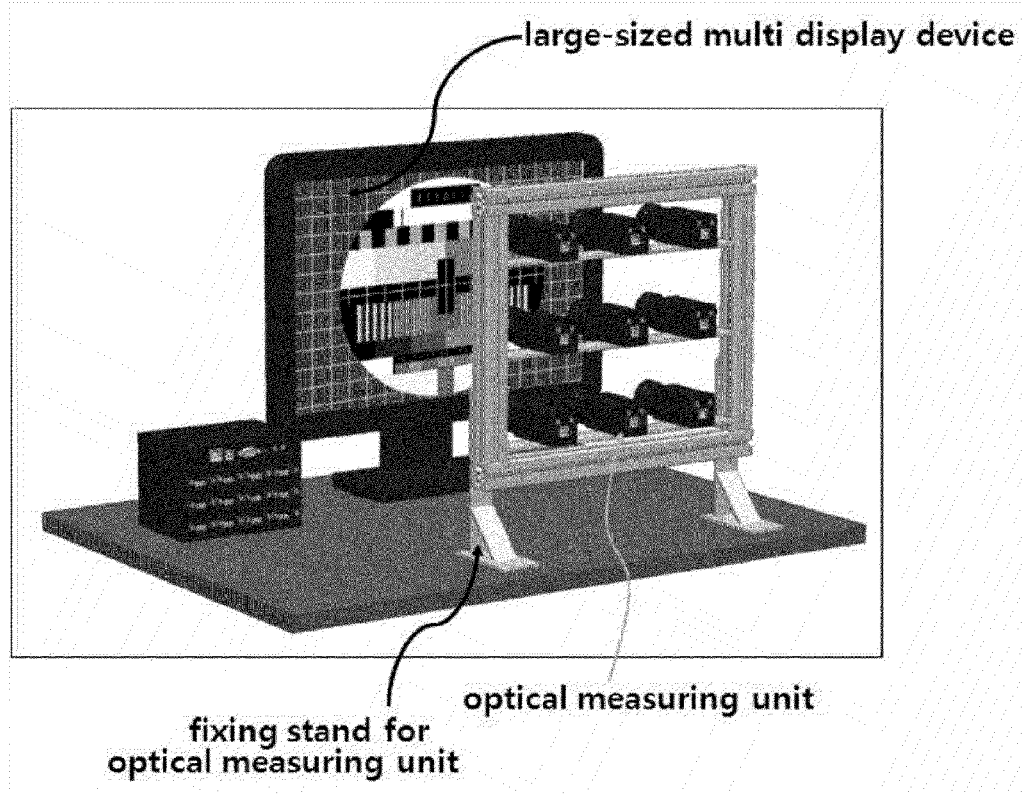
[Fig. 6]
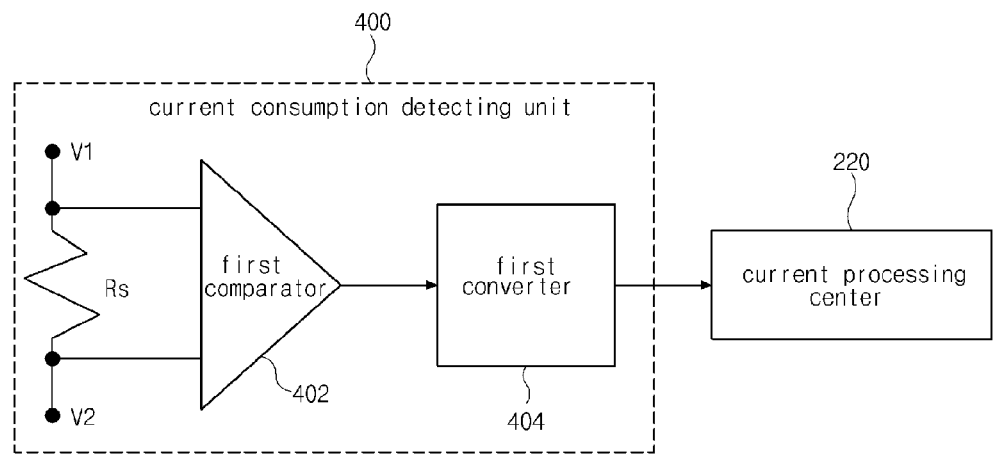

[Fig. 7]
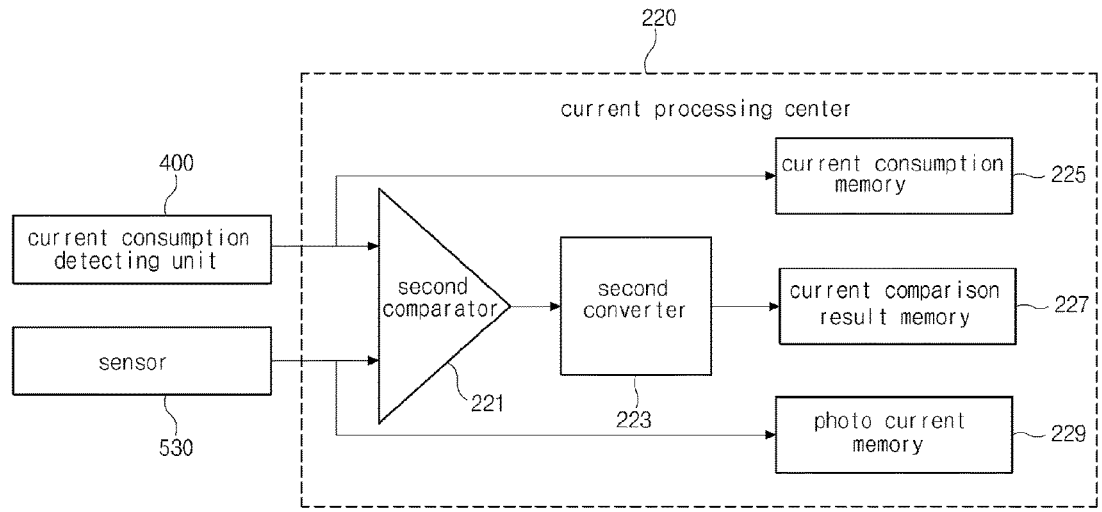
[Fig. 8]
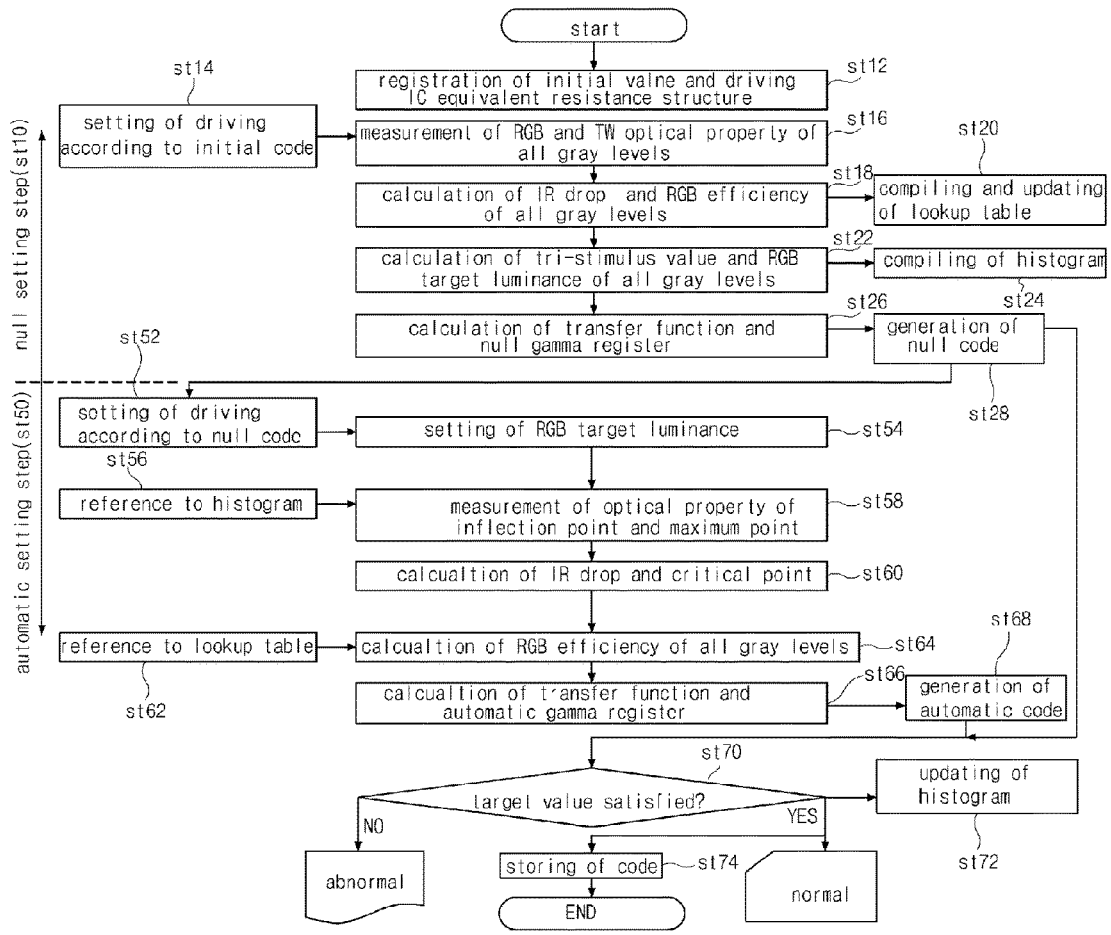

[Fig. 9]

| Name | Value | |
|---|---|---|
| PVDD | 5.00 | ⎫ |
| PVEE | -5.00 | ⎬ driving power |
| VDDH | 4.80 | |
| VDDL | 0.00 | ⎭ |
| White BRT | 300.00 | — W luminance |
| BRT (Min/Max) | +/- 50.00 | — allowable error range of W luminance |
| GAMMA | 2.20 | — slope |
| White x | 0.3800 | ⎫ W chromaticity |
| White y | 0.4010 | ⎭ |
| Chrom (Min/Max) | +/- 0.001 | — allowable error range of W chromaticity |
| Contrast | 20000 | — contrast ratio |
| RED x | 0.6563 | ⎫ |
| RED y | 0.3420 | |
| GREEN x | 0.2824 | ⎬ RGB chromaticity |
| GREEN y | 0.6867 | |
| Blue x | 0.1625 | |
| Blue y | 0.2399 | ⎭ |

[Fig. 10]
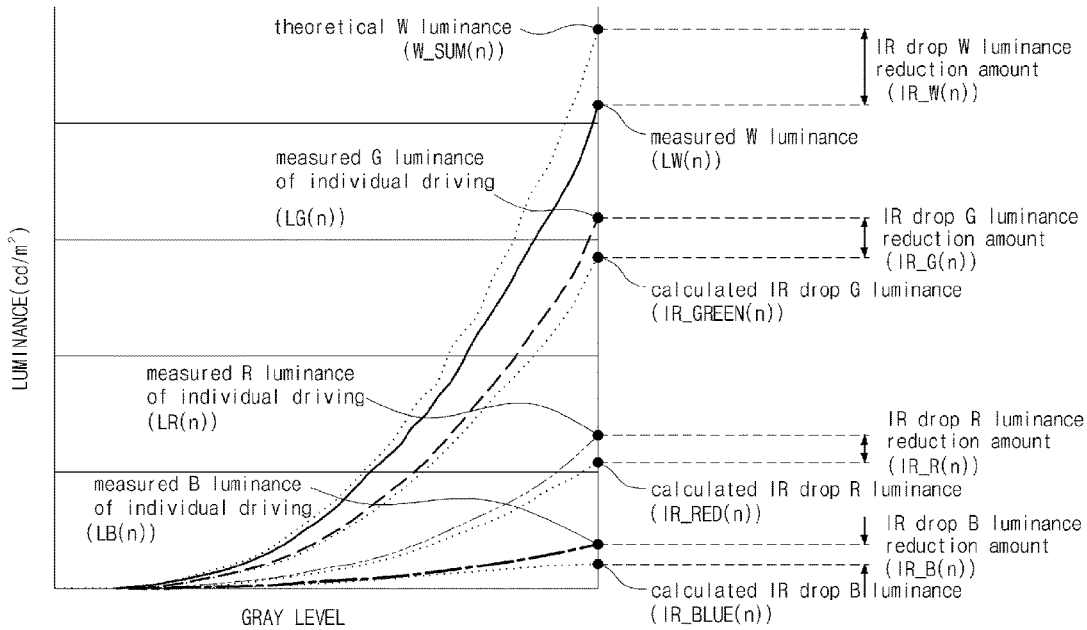
[Fig. 11]
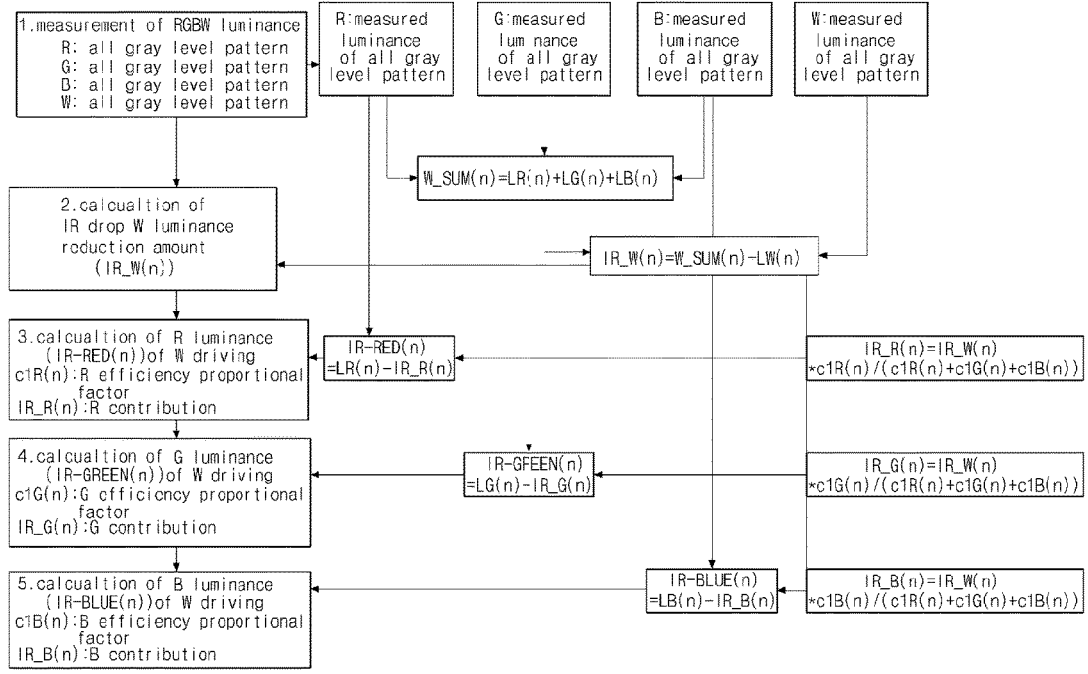

[Fig. 12]
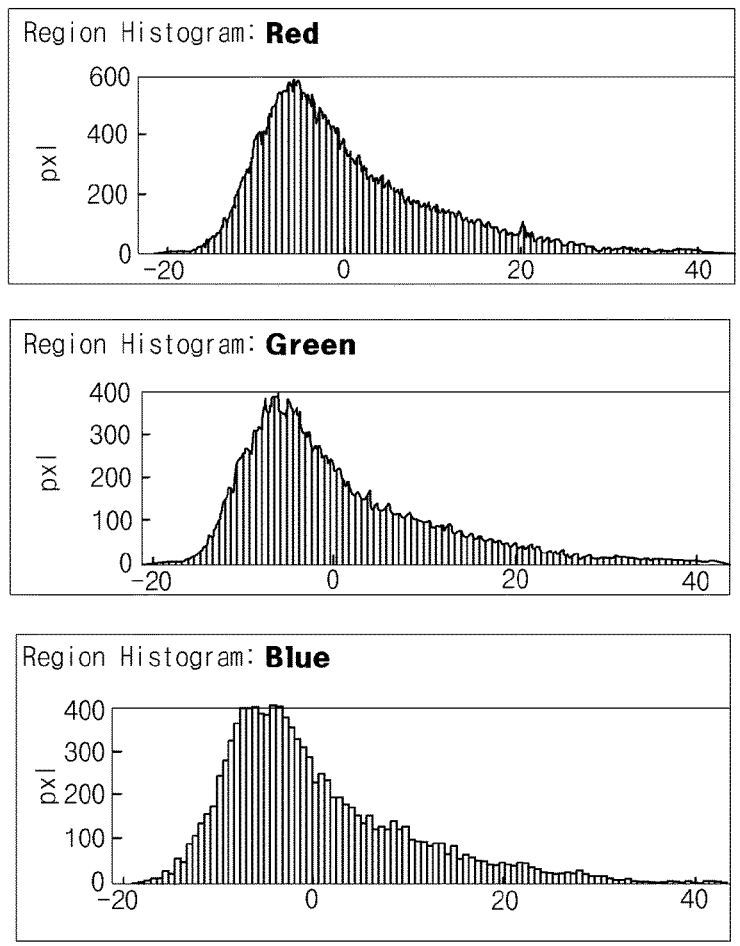
[Fig. 13]
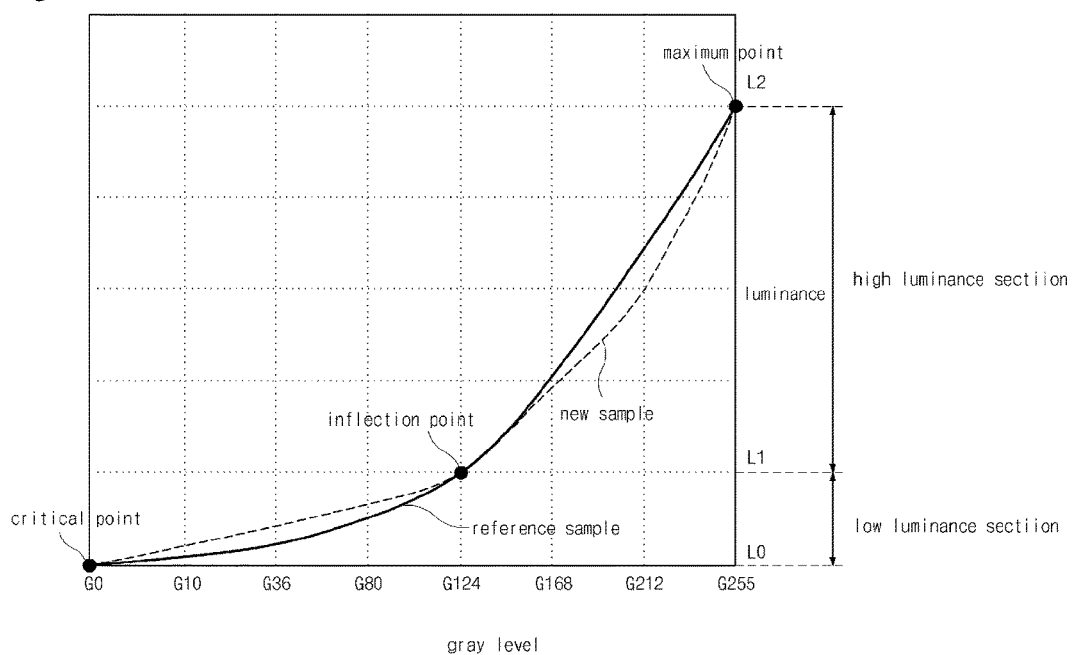

[Fig. 14]
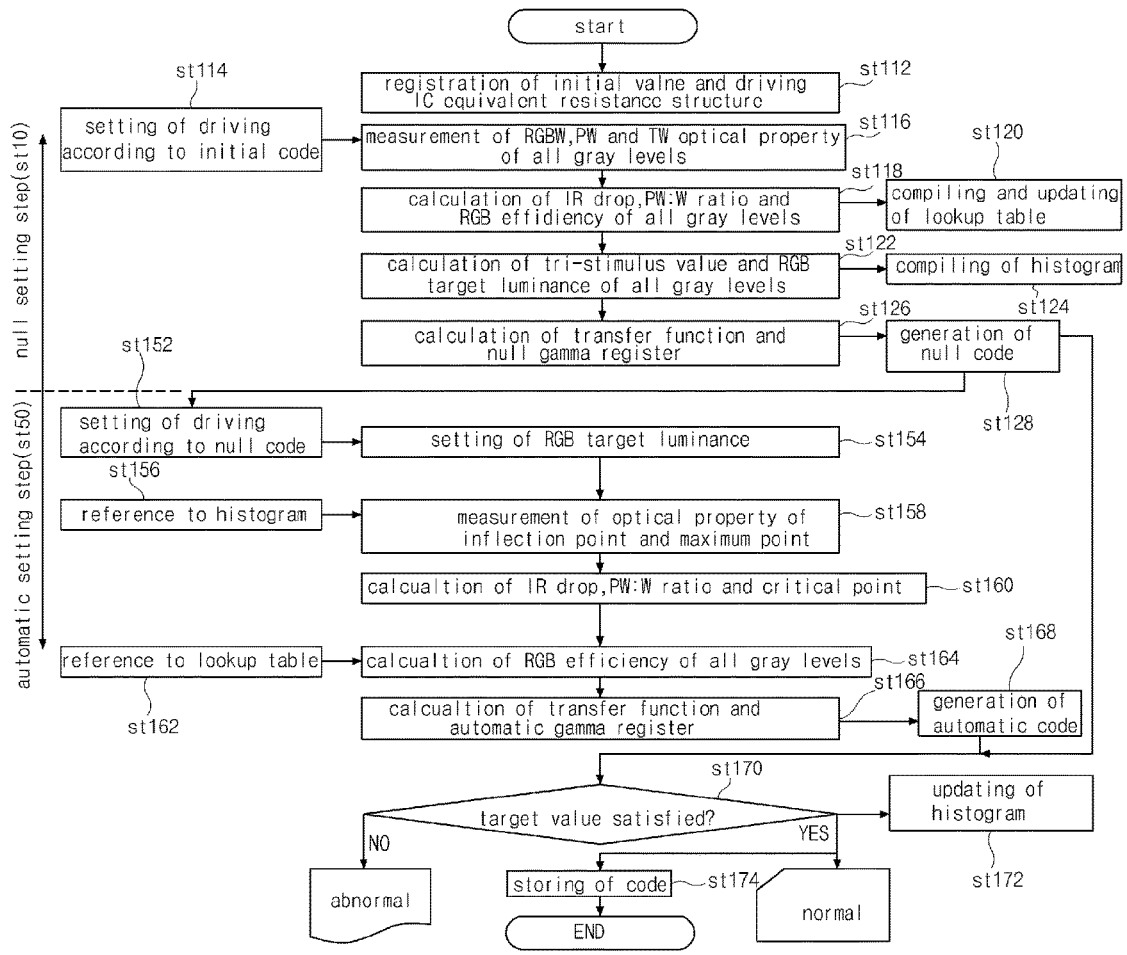

[Fig. 15]
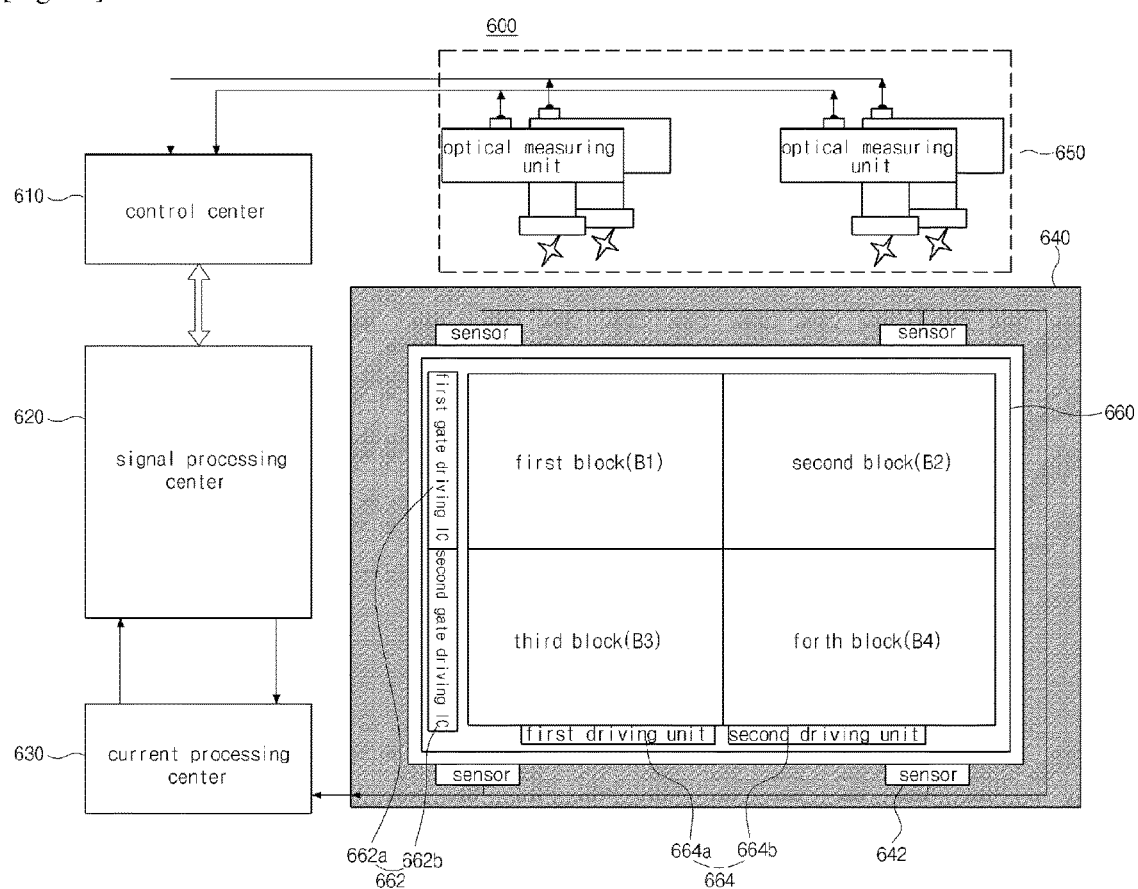

GAMMA SETTING SYSTEM OF DISPLAY DEVICE AND GAMMA SETTING METHOD THEREOF

CROSS REFERENCE TO RELATED APPLICATIONS

This application is the U.S. National Stage, pursuant to 35 U.S.C. § 371, of International Application No. PCT/KR2015/008096, filed Aug. 3, 2015, designating the United States and published on Feb. 11, 2016 as Publication No. WO 2016/021896, which claims the benefit of Korean Patent Application No. 10-2014-0099898 filed on Aug. 4, 2014 in the Korean Intellectual Property Office, the entire contents of which are incorporated herein by reference.

TECHNICAL FIELD

The present invention relates to a gamma setting system of a display device, more particularly, to a gamma setting system of an emissive display device of a source current driving type where a gamma resistance and a gamma voltage are directly set using an optical property of the display device and a gamma setting method of the gamma setting system.

BACKGROUND ART

An emissive display device of a source current driving type displays an image using an organic diode, a quantum dot diode, an organic transistor or a quantum dot transistor and has advantages such as a light weight, a thin profile and a low power consumption.

However, the emissive display device of a source current driving type has disadvantages such as a deviation in a diode and a transistor caused by a fabrication process of a back plane, a distortion of white balance caused by a deviation in a material and a fabrication process of an emitting element and a crosstalk according to a voltage drop (IR drop) caused by a deviation in an operational load of a sub-pixel when driven by a source current.

To improve the disadvantages of the emissive display device of a source current driving type, several compensation methods have been performed during or after a fabrication process. All the conventional compensation methods use a lookup table according to experimental data under predetermined and limited conditions.

The conventional compensation methods use data of a lookup table which are a result of an experiment on a correlation between input and output. The results according to the conventional compensation methods may be changed by an error or a contribution of variables due to excessively complicate equations or excessively many related variables. In addition, the results according to the conventional compensation methods may be changed by an inconsistent fabrication process. As a result, the conventional compensation methods have been used within an allowable error range of the variables due to deviation in a fabrication process with a relatively low accuracy. (Japanese Publication No. 2005-295513, Korean Publication No. 10-2010-0118773)

Further, the conventional compensation methods using a lookup table may be used for a case where a parameter between input and output image signals is selected according to an amount of a current or a gray level voltage, or a case where a correlation between input and output images is deduced without using a parameter. (Japanese Publication No. 2008-129334)

Moreover, the conventional compensation methods using a lookup table may be used for a chromaticity calculation using a tri-stimulus value of an XYZ coordinate system of CIE (Commission International de l'eclairage) to obtain a target luminance, a target chromaticity and a target slope (gamma 2.2).

Although an amount of current consumption has a correlation (a proportional relation) to an amount of output luminance due to the nature of an emissive display device of a source current driving type, a difference in efficiency due to a deviation in process for each sample (display device) may not be a constant such that a proportional relation of a related current efficiency is fixed or may not be replaced by a simple function. As a result, a lookup table may be used within a smaller range of a specific gray level only for a specific sample having a current efficiency similar to that of a predetermined reference sample. (PCT International Publication No. WO 2009/028675, Korean Publication No. 10-2009-0093018, Korean Publication No. 10-2011-0023141)

In addition, when a chromaticity of a white is compensated using an XYZ coordinate system of a tri-stimulus value, a chromaticity calculation according to an exact red-green-and-blue (RGB) luminance may not be performed. As a result, a chromaticity calculation may be replaced by data of lookup table corresponding to state variation. (Korean Publication No. 10-2009-0109872, Korean Patent No. 10-1065406)

In the conventional compensation methods using a lookup table, a gray level voltage is not calculated through an exact functional equation. Instead, an approximate value of a relative variation with respect to a reference sample is calculated. As a result, a repetitive circulation compensation is required for convergence of the approximate value. Accordingly, a fabrication time increases and a productivity decreases due to a long time for compensation. (Korean Publication No. 10-2012-0108445, Korean Publication No. 10-2012-0028007, Korean Publication No. 10-2012-0108236)

In the conventional compensation methods using a lookup table, a structure of a ladder resistor including at least two columns have to be reversely calculated for finding out a gamma resistance value for a source current driving generating an input image signal. Theoretically, a calculation for infinite number of cases has to be performed to obtain output voltages of the first column from output voltages of the second column reversely. Further, a circulative compensation method such as measurement of luminance according to a determined structure of a ladder resistor and determination of a new structure of a ladder resistor has to be performed to make a luminance according to a final output voltage a target value. As a result, a long operation time through trial and error is required.

Accordingly, the conventional compensation methods using a lookup table has disadvantages in accuracy and operation time. Since a variable for each sample is not a constant proportional to a fabrication process but a relative approximate value with respect to a reference sample, accuracy decreases. In addition, since a repetitive process for convergence is required, a long time is taken for compensation. Further, since consistency of variation in efficiency is degraded due to a fabrication process for each sample, samples where a lookup table with respect to a reference sample is applied is limited. The above disadvantages function as a hindrance factor in improvement of yield of wider samples.

DISCLOSURE OF INVENTION

Technical Problem

The present invention has been made in an effort to solve the problems occurring in the related art, and an object of the present invention is to provide a gamma setting system of an emissive display device of a source current driving type where a yield is improved by setting a gamma resistance and a gamma voltage directly using a current efficiency from a measurement of a luminance and by obtaining a target luminance with a higher accuracy and a wider setting range due to calculation of a transfer function, and a gamma setting method of the gamma setting system.

In addition, another object of the present invention is to provide a gamma setting system of an emissive display device of a source current driving type where a setting time and a fabrication time are reduced by setting a gamma resistance and a gamma voltage directly with a minimum measurement time of a luminance using a lookup table and a histogram, and a gamma setting method of the gamma setting system.

Solution to Problem

In order to achieve the above object, the present invention provides a gamma setting system for a display device including: an optical measuring unit measuring an optical property of a display device including an emissive display panel having red, green and blue sub-pixels; a control center performing a null setting step and an automatic setting step using the optical property of the display device; a system driving unit transmitting a result data between the display device and the control center; a first display unit displaying a TW target luminance, a TW target chromaticity and an RGB inherent chromaticity registered for the null setting step and the automatic setting step, a graph of a gray level voltage and a luminance of an RGB and a TW with respect to a gray level, a high level cell driving voltage (PVDD) and a low level cell driving voltage (PVEE) applied to an emitting element, a high level gamma source voltage (VDDH) and a low level gamma source voltage (VDDL) applied to a driving IC, a gamma slope, a contrast ratio, a driving type of the system, a gamma setting, an instruction on an execution command, and a progress state of the display device, wherein the control center: in the null setting step, calculates an IR drop RGB luminance based on a voltage drop due to a driving resistance of the display device by measuring an RGB luminance and a TW luminance of all gray levels of the display device, calculates an RGB efficiency of all gray levels from the IR drop RGB luminance, calculates an RGB target luminance from the TW target luminance, the TW target chromaticity and the RGB inherent chromaticity through a tri-stimulus value calculation, and generates a null code including a null gamma register from the RGB efficiency of all gray levels through a transfer function calculation; and in the automatic setting step, calculates the RGB efficiency of at least two gray levels from the RGB luminance and the TW luminance of the at least two gray levels of the display device, calculates the RGB efficiency of gray levels other than the at least two gray levels in reference to a lookup table, and generates an automatic code including an automatic gamma register from the RGB efficiency of the at least two gray levels and the RGB efficiency of the gray levels other than the at least two gray levels, and wherein the system driving unit transmits a command and an execution result between the control center and a peripheral device including the first display unit, a second display unit, a communicating unit, a process result storing unit, an operation controlling unit, a carrying unit, a defect managing unit, a power supplying unit, a current processing center and a sample supporting unit.

In another aspect, the present invention provides a gamma setting system for a display device including: an optical measuring unit measuring an optical property of a display device including an emissive display panel having red, green and blue sub-pixels; a control center performing a null setting step and an automatic setting step using the optical property of the display device; a system driving unit transmitting a result data between the display device and the control center; a first display unit displaying a TW target luminance, a TW target chromaticity and an RGB inherent chromaticity registered for the null setting step and the automatic setting step, a graph of a gray level voltage and a luminance of an RGB and a TW with respect to a gray level, a high level cell driving voltage (PVDD) and a low level cell driving voltage (PVEE) applied to an emitting element, a high level gamma source voltage (VDDH) and a low level gamma source voltage (VDDL) applied to a driving IC, a gamma slope, a contrast ratio, a driving type of the system, a gamma setting, an instruction on an execution command, and a progress state of the display device, wherein the control center: in the null setting step, calculates a contribution of a PW luminance to a TW luminance according to a ratio of the PW luminance to a W luminance (PW:W ratio) by measuring an RGBW luminance, the PW luminance and the TW luminance of all gray levels of the display device, calculates an IR drop PW luminance and an IR drop RGB luminance based on a voltage drop due to a driving resistance of the display device, calculates an RGB efficiency of all gray levels from the IR drop RGB luminance, calculates an RGB target luminance from the TW target luminance, the TW target chromaticity, the RGB inherent chromaticity and the PW:W ratio through a tri-stimulus value calculation, and generates a null code including a null gamma register from the RGB efficiency of all gray levels through a transfer function calculation; and in the automatic setting step, calculates the RGB efficiency of at least two gray levels from the RGBW luminance, the PW luminance and the TW luminance of the at least two gray levels of the display device, calculates the RGB efficiency of gray levels other than the at least two gray levels in reference to a lookup table, and generates an automatic code including an automatic gamma register from the RGB efficiency of the at least two gray levels and the RGB efficiency of the gray levels other than the at least two gray levels, and wherein the system driving unit transmits an instruction on a command and an execution result between the control center and a peripheral device including the first display unit, a second display unit, a communicating unit, a process result storing unit, an operation controlling unit, a carrying unit, a defect managing unit, a power supplying unit, a current processing center and a sample supporting unit.

In another aspect, the present invention provides a gamma setting method for a display device including: registering a TW target luminance, a TW target chromaticity and an RGB inherent chromaticity to a gamma setting system; displaying the TW target luminance, the TW target chromaticity and the RGB inherent chromaticity, a graph of a gray level voltage and a luminance of an RGBW with respect to a gray level, a high level cell driving voltage (PVDD) and a low level cell driving voltage (PVEE) applied to an emitting element, a high level gamma source voltage (VDDH) and a low level gamma source voltage (VDDL) applied to a driving IC, a gamma slope, a contrast ratio, a driving type of the system, a gamma setting, an instruction on an execution command, and a progress state of the display device; measuring an optical property of all gray levels of a display device including an emissive display panel having red, green and blue sub-pixels; performing a null setting step which calculates an IR drop RGB luminance based on a voltage drop due to a driving resistance of the display device from an RGB luminance and a TW luminance of all gray levels of the display device, calculates an RGB efficiency of all gray levels from the IR drop RGB luminance, calculates an RGB target luminance from the TW target luminance, the TW target chromaticity and the RGB inherent chromaticity through a tri-stimulus value calculation, and generates a null code including a null gamma register from the RGB efficiency of all gray levels through a transfer function calculation; performing an automatic setting step which calculates the RGB efficiency of at least two gray levels from the RGB luminance and the TW luminance of the at least two gray levels of the display device, calculates the RGB efficiency of gray levels other than the at least two gray levels in reference to a lookup table, and generates an automatic code including an automatic gamma register from the RGB efficiency of the at least two gray levels and the RGB efficiency of the gray levels other than the at least two gray levels; and transmitting an instruction on a command and an execution result between a control center and a peripheral device including a first display unit, a second display unit, a communicating unit, a process result storing unit, an operation controlling unit, a carrying unit, a defect managing unit, a power supplying unit, a current processing center and a sample supporting unit by a control center.

In another aspect, the present invention provides a gamma setting method for a display device including: registering a TW target luminance, a TW target chromaticity and an RGB inherent chromaticity to a gamma setting system; displaying the TW target luminance, the TW target chromaticity and the RGB inherent chromaticity, a graph of a gray level voltage and a luminance of an RGB and a TW with respect to a gray level, a high level cell driving voltage (PVDD) and a low level cell driving voltage (PVEE) applied to an emitting element, a high level gamma source voltage (VDDH) and a low level gamma source voltage (VDDL) applied to a driving IC, a gamma slope, a contrast ratio, a driving type of the system, a gamma setting, an instruction on an execution command, and a progress state of the display device; measuring an optical property of a display device including an emissive display panel having red, green and blue sub-pixels; performing a null setting step which calculates a contribution of a PW luminance to a TW luminance according to a ratio of the PW luminance to a W luminance (PW:W ratio) from an RGBW luminance, the PW luminance and the TW luminance of all gray levels of the display device, calculates an IR drop PW luminance and an IR drop RGB luminance based on a voltage drop due to a driving resistance of the display device, calculates an RGB efficiency of all gray levels from the IR drop RGB luminance, calculates an RGB target luminance from the TW target luminance, the TW target chromaticity, the RGB inherent chromaticity and the PW:W ratio through a tri-stimulus value calculation, and generates a null code including a null gamma register from the RGB efficiency of all gray levels through a transfer function calculation; performing an automatic setting step which calculates the RGB efficiency of at least two gray levels from the RGBW luminance, the PW luminance and the TW luminance of the at least two gray levels of the display device, calculates the RGB efficiency of gray levels other than the at least two gray levels in reference to a lookup table, and generates an automatic code including an automatic gamma register from the RGB efficiency of the at least two gray levels and the RGB efficiency of the gray levels other than the at least two gray levels; and transmitting an instruction on a command and an execution result between a control center and a peripheral device including a first display unit, a second display unit, a communicating unit, a process result storing unit, an operation controlling unit, a carrying unit, a defect managing unit, a power supplying unit, a current processing center and a sample supporting unit.

Advantageous Effects of Invention

In a gamma setting system of a display device and a gamma setting method thereof according to the present invention, a yield is improved by setting a gamma resistance and a gamma voltage directly using a current efficiency (cd/A) from a measurement of an optical property including a luminance and by obtaining a target luminance with a higher accuracy and a wider setting range due to calculation of a transfer function.

Further, in a gamma setting system of a display device and a gamma setting method thereof according to the present invention, a setting time and a fabrication time are reduced by setting a gamma resistance and a gamma voltage directly with a minimum measurement time of a luminance using a lookup table and a histogram.

In a gamma setting system of a display device and a gamma setting method thereof according to the present invention, since an allowable deviation in a white (W) luminance and a W chromaticity of a target product contents is set from a minimum to a maximum by calculation, a yield is obtained with a wider adjustment range than that by a compensation method using a lookup table corresponding to a relative variation with respect to a reference value. In addition, since samples classified as deterioration due to non-uniformity in efficiency are adjusted normal by measuring a current efficiency of each sample directly, a yield for samples of various efficiencies is improved. Moreover, since a setting value for an exact gamma slope of 2.2 is obtained by a calculation, a skin effect phenomenon is prevented. Further, since a setting time is reduced due to a selective gray level using a lookup table and a histogram, a productivity is improved.

In a gamma setting system of a display device and a gamma setting method thereof according to the present invention, after a gamma voltage due to a gamma resistance is obtained by calculating a ladder resistor of a driving integrated circuit (IC) equivalently, an output signal and an efficiency relation are set. As a result, a time for finding out an optimum value of a ladder resistor is reduced and a deviation according to a voltage error due to a similar resistance is reduced.

Further, in a gamma setting system of a display device and a gamma setting method thereof according to the present invention, a gamma setting time for a new sample (each display device) is reduced and a productivity is improved by using a lookup table on a slope information of a tendency in an efficiency variation and a histogram on a distribution of inflection points of an efficiency.

BRIEF DESCRIPTION OF DRAWINGS

FIG. 1 is a view showing a gamma setting system of a display device according to a first embodiment of the present invention.

FIG. 2 is a view showing an image of a first display unit of a gamma setting system of a display device according to a first embodiment of the present invention.

FIG. 5 is a view showing an optical measuring unit of a gamma setting system of a display device according to a first embodiment of the present invention.

FIG. 6 is a view showing a current consumption detecting unit of a gamma setting system of a display device according to a first embodiment of the present invention.

FIG. 7 is a view showing a current processing center of a gamma setting system of a display device according to a first embodiment of the present invention.

FIG. 8 is a flow chart illustrating a gamma setting method of a display device according to a first embodiment of the present invention.

FIG. 9 is a view showing an initial setting image of a gamma setting method of a display device according to a first embodiment of the present invention.

FIG. 10 is a view showing a luminance reduction amount with respect to a color and a gray level due to an IR drop of a display device according to a first embodiment of the present invention.

FIG. 11 is a flow chart illustrating a method of calculating a luminance with respect to a color and a gray level of a W driving based on an IR drop of a display device according to a first embodiment of the present invention.

FIG. 12 is a view showing a histogram used in a gamma setting method of a display device according to a first embodiment of the present invention.

FIG. 13 is a view illustrating an automatic setting step of a gamma setting method of a display device according to a first embodiment of the present invention.

FIG. 14 is a flow chart illustrating a gamma setting method of a display device according to a second embodiment of the present invention.

FIG. 15 is a view showing a gamma setting system of a display device according to a second embodiment of the present invention.

MODE FOR THE INVENTION

Figure 3:
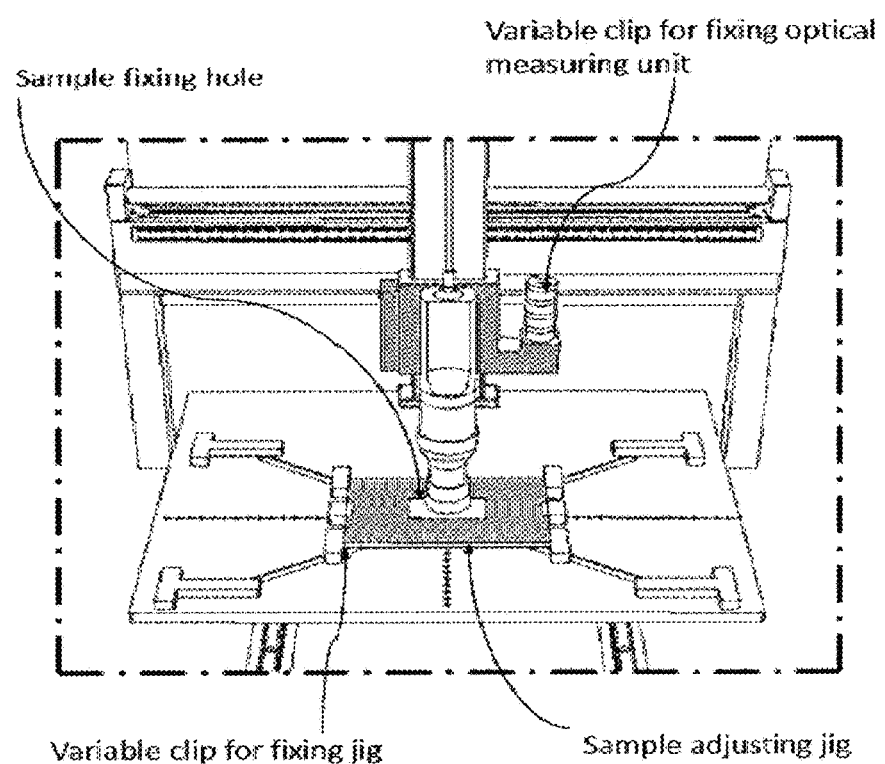
FIG. 3 is a view showing a clip type jig of a carrying unit of a gamma setting system of a display device according to a first embodiment of the present invention.
Figure 4:
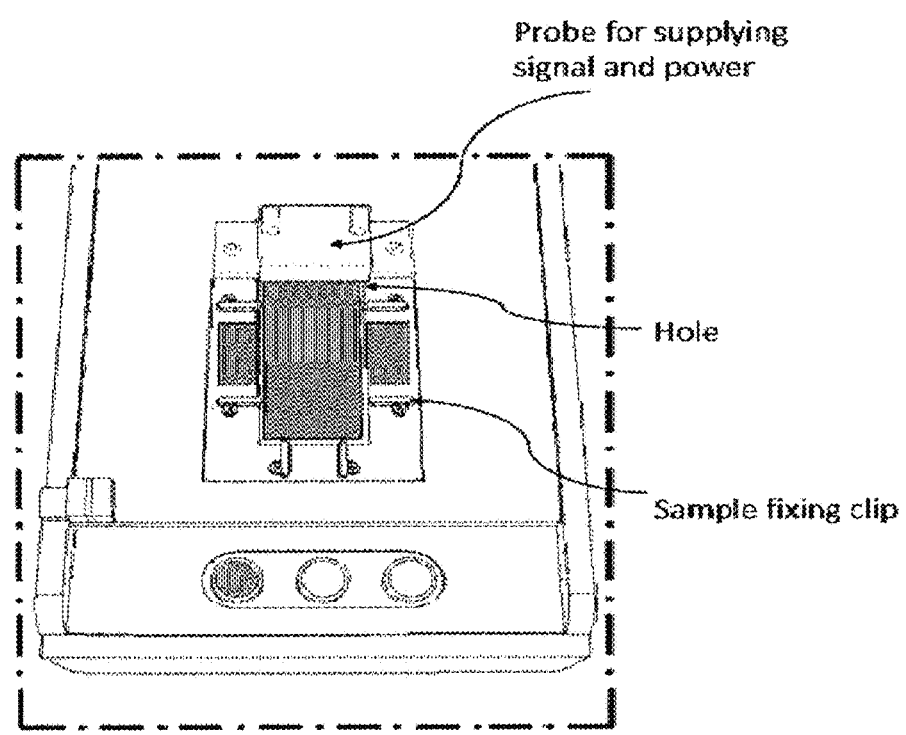
FIG. 4 is a view showing a hole type jig of a carrying unit of a gamma setting system of a display device according to a first embodiment of the present invention.

FIG. 1 is a view showing a gamma setting system of a display device according to a first embodiment of the present invention, FIG. 2 is a view showing an image of a first display unit of a gamma setting system of a display device according to a first embodiment of the present invention, FIG. 3 is a view showing a clip type jig of a carrying unit of a gamma setting system of a display device according to a first embodiment of the present invention, FIG. 4 is a view showing a hole type jig of a carrying unit of a gamma setting system of a display device according to a first embodiment of the present invention, FIG. 5 is a view showing an optical measuring unit of a gamma setting system of a display device according to a first embodiment of the present invention, FIG. 6 is a view showing a current consumption detecting unit of a gamma setting system of a display device according to a first embodiment of the present invention, and FIG. 7 is a view showing a current processing center of a gamma setting system of a display device according to a first embodiment of the present invention.

In FIG. 1, a gamma setting system 100 according to a first embodiment of the present invention includes primary units such as a control center 110, a system driving unit 120 and an optical measuring unit 130 and secondary units such as first and second displaying units 140 and 150, a communicating unit 160, a process result storing unit 170, an operation controlling unit 180, a carrying unit 190, a defect managing unit 200, a power supplying unit 210, a current processing center 220 and a sample supporting unit 420.

The control center 110 is an application processor (AP) system for supplying an operation command signal of a null setting step and an automatic setting step to the system driving unit 120. For example, the control center 110 may be a computer while a display device is fabricated, and the control center 110 may be a micro computer unit (MCU) after a display device is fabricated.

The control center 110 performs the null setting step and the automatic setting step for setting a gamma resistance and a gamma voltage during or after fabrication, generates the operation command signal relating to the null setting step and the automatic setting step, transmits an information of a measured optical property including a measured luminance from the optical measuring unit 130 to the system driving unit 120, and controls operation of the system driving unit 120, the optical measuring unit 130 and peripheral devices.

During the null setting step, an IR drop RGB luminance and an RGB efficiency with respect to all gray levels are calculated using the measured luminance with respect to all gray levels of a display device 500 of a sample, an RGB target luminance is calculated by a tri-stimulus value calculation, and the gamma resistance and the gamma voltage corresponding to the RGB target luminance are set by a transfer function calculation. To calculate the efficiency with respect to all gray levels more accurately, a pattern of a dithering type having an increased gray level where a low bit is added to a reference bit may be applied to the null setting step.

During the automatic setting step, the gamma resistance and the voltage corresponding to the RGB target luminance with respect to all gray levels are calculated by calculating efficiencies at a critical point, an inflection point and a maximum point using the measured luminance with respect to specific gray levels such as the gray levels of the critical point and the maximum point for reduction of a setting time and by calculating efficiencies at the other gray levels. The setting time may be further reduced by selecting the inflection point using a histogram or by selecting a point corresponding to a luminance smaller than about 2 $cd/cm^2$ as the inflection point.

The system driving unit 120 converts a result data of the control center 110 into a concrete signal and transmits the concrete signal, or transmits the result data of the peripheral devices to the control center 110. The system driving unit 120 processes signals for operation of a first interface 310, a signal processing center 320, an initial code memory 330, a null code memory 335, a lookup table memory 340, a histogram memory 345, a test signal generating unit 350, a code signal generating unit 360, an MTP (media transfer protocol) code downloading unit 370, a system power generating unit 380, a panel power generating unit 390 and a current consumption detecting unit 400 under control of the control center 110.

Although not shown, the signal processing center 320 may include a transfer function processing unit for performing a process by a transfer function calculation at the null setting step, a lookup table processing unit for processing a lookup table data at the null setting step and the automatic setting step, and a histogram processing unit for processing a histogram data at the null setting step and the automatic setting step.

In addition, the signal processing center 320 processes the information of the measured optical property including the luminance from the control center 110 and stores the results of an initial code and a null code in the initial code memory 330 and the null code memory 340, respectively, stores the lookup table data generated at the null setting step in the lookup table memory 340, and stores the histogram data generated at the null setting step in the histogram memory 345.

The initial code memory 330 stores the initial code used at the first gamma setting operation for a sample of a new environment (for example, a sample fabricated through a new process or a sample fabricated according to a new specification), and stores the null code used at the continuous gamma setting operation for a sample of an identical environment (for example, a sample fabricated through the identical process or a sample fabricated according to the identical specification).

Here, each of the initial code and the null code includes a plurality of registers for setting a driving condition of a driving IC (integrated circuit) 520 of the display device 500. For example, the plurality of registers may include a register for setting a driving voltage, a register for setting a resolution, a register for setting a driving timing, a register for setting a driving signal and a gamma register for setting a gamma resistance.

The initial code includes an initial gamma register for setting an initial driving condition, and the null setting step is performed using the initial gamma register of the initial code.

The null code includes a null gamma register generated by updating the initial gamma register through the null setting step, and the automatic setting step is performed using the null gamma register of the null code.

The lookup table memory 340 stores the lookup table data generated at the null setting step, and the histogram memory 345 stores the histogram data generated at the null setting step.

The test signal generating unit 350 generates a signal corresponding to a test signal which is used at the null setting step and the automatic setting step according to control of the signal processing center 320, and transmits the signal to the display device 500.

The code signal generating unit 360 generates a signal corresponding to the gamma registers of the initial code and the null code which are used at the null setting step and the automatic setting step according to control of the signal processing center 320.

The MTP code downloading center 370 stores the null code including the null gamma register or the automatic code including the automatic gamma register which are set through the null setting step or the automatic setting step according to control of the signal processing center 320 in the driving IC 520 of the display device 500 so that the display device 500 can use the automatic gamma register continuously for image display.

The system power generating unit 380 generates voltages necessary for driving of the signal processing center 320 using a power of the power supplying unit 210 under control of the signal processing center 320 and supplies the voltages to the signal processing center 320.

The panel power generating unit 390 generates voltages (for example, PVDD, PVEE) necessary for driving of the emissive display panel 510 using the power of the power supplying unit 210 under control of the signal processing center 320 and supplies the voltages to the display device 500.

The current consumption detecting unit 400 detects a current consumption using the power supplied from the panel power supplying unit 390 to the display device 500 and transmits the current consumption to the current processing center 220. The detailed structure and function of the current consumption detecting unit 400 will be illustrated later.

The first interface 310 transmits signals between the control center 110 and the system driving unit 120, and the second interface 410 transmits signals between the system driving unit 120 and the driving IC 520 of the display device 500.

The first display unit 140 displays a progress state or a result of an algorithm performing in the control center 110 as a numerical value or a graph. In addition, the first display unit 140 displays an input command on progress of automatic, semiautomatic and manual steps, or displays an input information (for example, a TW (total white) target luminance, a TW target chromaticity, an RGB inherent chromaticity, a high level cell driving voltage (PVDD) and a low level cell driving voltage (PVEE) applied to an emitting element, a high level gamma source voltage (VDDH) and a low level gamma source voltage (VDDL) applied to the driving IC, a gamma slope, a contrast ratio, a driving type of the system, a setting of the system and instructions on an execution command. The first display unit 140 may display an updated content when a kind of the driving IC or a structure of the gamma resistance is changed.

For example, as shown in FIG. 2, the first display unit 140 may display a chromaticity coordinate graph including a target value of TW and an inherent value of RGB and a graph including a gray level voltage and a luminance of RGB and TW according to a gray level. In addition, the first display unit 140 may display a measured data of a luminance and a chromaticity according to a gray level, a command inputted and outputted during the manual step and a transmission content of a communication command between systems together with the graphs.

Further, when the gamma setting are performed for a plurality of display devices (samples) at the same time, the first display unit 140 may display a procedure of the gamma setting for the plurality of samples.

The second display unit 150 displays of a progress state or a result of the setting operation of the gamma setting system 100. For example, the second display unit 150 may be a lighting device which turns on a green light for a normal progress of the setting operation, turns on a yellow light for completion of the setting operation about one sample, turns on a red light for occurrence of a poor sample, and sequentially turns on the red and yellow lights for a disorder of the system or an equipment or an emergency.

Here, an operator may easily verify a state of the plurality of gamma setting systems 100 due to first display unit 140 displaying an operation state of each of the plurality of gamma setting systems during the null setting step or the automatic setting step.

The communicating unit 160 transmits a signal between an external automation system (not shown) and the plurality of gamma setting systems 100. For example, the communicating unit 160 may transmit a control signal of the automation system to the corresponding gamma setting system 100, and may transmit the operation state and the progress of each of the plurality of gamma setting systems 100 to the automation system. The communicating unit 160 may include a protocol for communication.

The process result storing unit 170 cumulatively stores a process result of the null setting step and the automatic setting step about the plurality of samples. For example, the process result may include a result distribution chart and a share of a judgment and a processing, and a state of a fabrication process and a step yield may be analyzed by utilizing the process result to production management.

Specifically, the process result includes a distribution chart of a low luminance property and an application ability of the inflection point may be improved by utilizing the distribution chart of a low luminance property to a periodic update of the histogram.

The operation controlling unit 180 classifies an important function and an emergency function of functions of the control center 110 as a special function and performs an operation corresponding to a prompt command for an immediate operation and a command regardless of a disorder and an operation. For example, the operation by the operation controlling unit 180 may include an automatic progress according to a program, a manual progress according to an operation command of a user and an emergency stop according to a malfunction or a state of emergency.

The carrying unit 190 fixes the sample at a predetermined position for an optical measurement, or inputs or outputs the sample for an operation in an in-line conveyor of production process. For example, the carrying unit 190 may carry a single sample, or may carry a plurality of samples using a pallet. In addition, the carrying unit 190 may carry a sample horizontally or vertically.

Here, the carrying unit 190 may transfer the display device 500 to the gamma setting system 100 for gamma setting. When the display device 500 has a relatively large size, the optical measuring unit 130 of the gamma setting system 100 may be equipped in the in-line conveyor and the gamma setting may be performed for the display device 500 transferred in the in-line conveyor. In this case, a transfer speed of the display device 500 in the in-line conveyor may coincide with a gamma setting speed of the gamma setting system 100.

The defect managing unit 200 judges the plurality of samples as normality or abnormality by comparing the gamma register calculated in the automatic setting step with an adjustment range of a target value and stores a judgment result. In addition, the defect managing unit 200 verifies a degree and a kind of abnormality and provides data for analyzing a tendency of abnormality about the whole fabrication process.

Further, the defect managing unit 200 stores an identification number of the sample judged as the abnormality. The automation system may receive the identification number of the defect managing unit 200 through the communicating unit 160 and may perform a subsequent action such as operation stop. As a result, a fabrication cost and a fabrication time are reduced, and the sample of the abnormality is sorted when the abnormality occurs or after completion of fabrication.

The power supplying unit 210 generates a whole power for driving of the gamma setting system 100 and functionally provides the power based on stability of the power and effective distribution of supply ability. For example, the power supplying unit 210 may selectively classify and provide a driving power of the display panel 510, a general driving power used in a basic logic and a driving power of the carrying unit 190 requiring a mechanical power.

The current processing center 220 performs an auxiliary function of modifying a deviation between the samples using an input current consumption and an output photo current. For example, the current processing center 220 may analyze a correlation between the current consumption for a photo output of the emissive display panel 510 from the current consumption detecting unit 400 and the photo current from the sensor 430 in a periphery of the sample supporting unit 420 where the emissive display panel 510 is disposed to maintain a relative reference value for each gray level and modify the deviation between the samples.

An analogous optical measuring method using the current consumption and the photo current is used as an auxiliary method for an absolute optical measuring method using a photo property including a luminance of the optical measuring unit 130. Since the detection speed of the photo current is fast in response to a fast response speed of the emissive display panel 510, the setting time is further reduced.

In addition, the optical measuring unit 130 may include a luminance meter and a spectroscope for measuring the photo property including a luminance and a chromaticity of a test image displayed by the emissive display panel 510. The luminance meter and the spectroscope may be selected based on an accuracy and a measurement speed, and a relative position of the optical measuring unit 130 and the emissive display panel 510 may be fixed or vary.

On the other hand, measurement of the photo property by the optical measuring unit 130 may be replaced by the analogous optical measuring method. Since the correlation between the input current consumption and the output photo current calculated by the current processing center 220 is proportional to the current efficiency (cd/A) calculated by the signal processing center 320, the current efficiency may be relatively recognized from the correlation between the input current consumption and the output photo current by the analogous optical measuring method.

The sample supporting unit 420 fixes a position of the emissive display panel 510 (including the driving IC) for protection. In addition, the sample supporting unit 420 transmits the test signal of the system driving unit 120 to the emissive display panel 510 and transmits the measured signal such as the photo current of the emissive display panel 510 to the current processing center 220. For example, a jig or a pallet may be used as the sample supporting unit 420.

The sample supporting unit 420 having the emissive display panel 510 may be transferred from an in-line transport tray to the gamma setting system 100 to perform the gamma setting step, and the sample supporting unit 420 having the emissive display panel 510 may be transferred may be transferred from the gamma setting system 100 to the in-line transport tray after completion of the gamma setting step. The input speed and the output speed of the emissive display panel 510 to the gamma setting system 100 may be the same as each other.

The sample supporting unit 420 may include a fixing device for fixing at least one of four sides of the emissive display panel 510 to fix the position of the emissive display panel 510. For example, as shown in FIGS. 3 and 4, the sample supporting unit 420 may have a clip type where the jig having the sample is fixed by a clip or a hole type where the sample is inserted into a hole to be fixed.

The clip type sample supporting unit 420 may include a sample adjusting jig for fixing the sample to a sample fixing hole, a variable clip for fixing the sample adjusting jig and a variable clip for fixing the optical measuring unit 130. The hole type sample supporting unit 420 may include a probe for supplying a signal and a power to the sample, a hole where the sample is inserted and a sample fixing clip for fixing the sample inserted into the hole.

The sample supporting unit 420 may include a fixing device for temporarily fixing the emissive display panel 510 to prevent defect such as a scratch while the emissive display panel 510 is transferred. For example, the fixing device may use a suction by a vacuum, an elasticity by a spring or a gravity by a weight. Specifically, when the display device 500 has a flexible type, a balance may be maintained by sucking the display device 500 with a vacuum chuck at a rear surface thereof.

Here, after the emissive display panel 510 is fixed, the probe may automatically contact the display device 500. Alternatively, the probe may contact the display device 500 to fix the emissive display panel 510.

The sample supporting unit 420 may include a circuit part and a power part for transmitting the test signal and the gamma code of a setting result to the emissive display panel 510. For example, the sample supporting unit 420 may include a probe connector having a probe type or a contact type.

The test signal may include a signal for measuring an optical property when the RGB having the same voltage is applied for several seconds and a signal for judging of normality or abnormality. The sample supporting unit 420 may include an identifying device such as a bar code for judging of normality or abnormality and a classifying device such as a chuck for classifying the sample after the judgment.

In addition, the sample supporting unit 420 may include a measuring device for measuring a property of the emissive display panel 510. For example, the sample supporting unit 420 may include the sensor 430 at a periphery of the emissive display panel 510 and the sensor 430 may generate the photo current corresponding to the optical property including a luminance of the light emitted from the emissive display panel 510.

Although the sensor 430 is formed on the sample supporting unit 420 in the first embodiment, the sensor 430 may be formed on the emissive display panel 510 in another embodiment. In this case, the gamma setting may be performed even while the display device 500 is used.

Further, a relative position between the sample supporting unit 420 and the measuring device may be fixed or vary, and the measuring device may be stopped at a predetermined path or a predetermined coordinate for a predetermined time period to adjust a position for photo measurement.

In addition, the measuring device may be disposed at a periphery of a pixel of the display device 500 and may transmit a signal to an external jig so that the measuring device can be used as an auxiliary means using a difference of a proportional property to the optical measuring unit 130. For example, the measuring device may include a sensor for each wavelength (a photodiode) to directly measure the light.

The sample supporting unit 420 may fix a plurality of emissive display panels 510 at the same time. In this case, a gap distance between the plurality of emissive display panels 510 may be greater than a gap distance between the measuring devices.

In addition, the optical measuring unit 130 may be disposed on an upper surface, a lower surface or an entire surface of the sample for automation, and may move on an installation surface to measure a luminance and a chromaticity.

In FIG. 5, when the display device 500 has a relatively large size, the display device 500 may be vertically disposed, and a plurality of optical measuring units 130 may be disposed in front of the display device 500 using a fixing stand to measure a luminance and a chromaticity of a plurality of blocks of the emissive display panel 510.

The display device 500 of the sample may include the emissive display panel 510 displaying an image using a plurality of pixels (not shown) and the driving IC 520 connected to the emissive display panel 510 and supplying the driving signal for displaying the image.

Here, each of the plurality of pixels of the emissive display panel 510 includes red, green and blue sub-pixels, and an organic emitting element such as an organic diode and an organic transistor or a quantum dot emitting element such as a quantum dot diode and a quantum dot transistor is formed in each of the plurality of pixels of the emissive display panel 510.

For performing the analogous optical measuring method, as shown in FIGS. 6 and 7, the current consumption detecting unit 400 includes a sensing resistor Rs, a first comparator 402 and a first converter 404, and the current processing center 220 includes a second comparator 221, a second converter 223, a current consumption memory 225, a current comparison result memory 227 and a photo current memory 229.

The sensing resistor Rs of the current consumption detecting unit 400 is connected to a transmitting line of the power supplied from the panel power generating unit 390 to the display device 500 in series, and first and second voltages V1 and V2 of both ends of the sensing resistor Rs are inputted to the first comparator 402.

The first comparator 402 compares the first and second voltages V1 and V2 to detect the current consumption and transmits the detected current consumption to the first converter 404. The first converter 404 converts the current consumption into a current consumption data and transmits the current consumption data to the current processing center 220.

For example, the first comparator 402 may be an operational amplifier (OP AMP), and the first converter 404 may be an analog-to-digital converter (ADC) converting an analog signal to a digital signal.

In addition, the current consumption of the current consumption detecting unit 400 and the photo current of the sensor 430 are inputted to the second comparator 221. The second comparator 221 compares the current consumption and the photo current and transmits a comparison result to the second converter 223. The second converter 223 converts the comparison result into a comparison result data and stores the comparison result data to the current comparison result memory 227.

Here, the current consumption of the current consumption detecting unit 400 and the photo current of the sensor 430 may be stored in the current consumption memory 225 and the photo current memory 229, respectively, of the current processing center 220. The current comparison result may be a correlation between the current consumption and the photo current proportional to the current efficiency of the display device 500.

The current processing center 220 may transmit the current comparison result of the current comparison result memory 227 to the signal processing center 320. The signal processing center 320 may further reduce the gamma setting time by subsidiarily using the current comparison result of the current processing center 220.

A gamma setting step is performed after an aging step where the emissive display panel 510 is driven under a predetermined driving condition for a predetermined time period to stabilize the emissive display panel 510.

Since the jig or the pallet including a circuit and a signal supplying line for a driving signal is used in the aging step, the jig or pallet for the aging step may be used as the sample supporting unit 420 of the gamma setting step. In this case, the gamma setting system 100 including the optical measuring unit 130 may be installed in an aging system.

The gamma setting method using the gamma setting system will be illustrated hereinafter.

FIG. 8 is a flow chart illustrating a gamma setting method of a display device according to a first embodiment of the present invention, FIG. 9 is a view showing an initial setting image of a gamma setting method of a display device according to a first embodiment of the present invention, FIG. 10 is a view showing a luminance reduction amount with respect to a color and a gray level due to an IR drop of a display device according to a first embodiment of the present invention, FIG. 11 is a flow chart illustrating a method of calculating a luminance with respect to a color and a gray level of a W driving based on an IR drop of a display device according to a first embodiment of the present invention, FIG. 12 is a view showing a histogram used in a gamma setting method of a display device according to a first embodiment of the present invention, and FIG. 13 is a view illustrating an automatic setting step of a gamma setting method of a display device according to a first embodiment of the present invention. The gamma setting method will be illustrated in reference to FIGS. 8 to 13 together with FIG. 1.

In FIG. 8, a gamma setting method of a display device according to a first embodiment of the present invention includes a null setting step st10 performed under a new environment or under an identical environment regularly/irregularly and an automatic setting step st50 performed under an identical environment.

The gamma setting system 100 according to a first embodiment of the present invention selects and performs one of the null setting step st10 and the automatic setting step st50, or performs both of the null setting step st10 and the automatic setting step st50. When both of the null setting step st10 and the automatic setting step st50 are performed, the automatic setting step st50 may be performed after the null setting step st10.

The null setting step st10 and the automatic setting step st50 may be performed using an RGB luminance and a TW luminance by a direct measurement of the optical measuring unit 130 with respect to an identical input gamma power. The lookup table may be updated when the null setting step st10 is repeatedly performed under an identical condition, and the histogram may be updated for the display device 500 judged as normality when the automatic setting step st50 is performed.

An initial gamma setting of a display device fabricated through a process or a specification different from the previous one may be performed in the new environment, and a repeated gamma setting of a display device fabricated through a process or a specification the same as the previous one may be performed in the identical environment.

In the null setting step st10, an IR drop RGB luminance and an RGB efficiency with respect to all gray levels is calculated by a measurement of an RGB luminance with respect to all gray levels and a TW luminance, and an RGB target luminance with respect to all gray levels is calculated by a tri-stimulus value calculation using a registered value and an RGB chromaticity. In addition, a null gamma register is calculated by a transfer function calculation, and a null code including the null gamma register is generated.

In the automatic setting step st50, an inflection point is calculated by using a histogram, and an efficiency with respect to all gray levels is calculated by a measurement of the RGB luminance and the TW luminance with respect to gray levels of the inflection point and a maximum point and the lookup table. As a result, an automatic code including an automatic gamma register is generated.

In another embodiment, a point having a luminance smaller than about 2 cd/cm$^2$ and a gray level corresponding to the luminance may be selected as the inflection point instead of using the histogram.

Since a ground energy state lower than the inflection point is an unstable energy conversion state, the RGB chromaticity of the point lower than the inflection point can not be used for the tri-stimulus value calculation because of irregularity in the inherent chromaticity. In addition, the point corresponding to a luminance smaller than about 2 cd/cm$^2$ has a relatively low chromaticity recognition due to a relatively low luminance. As a result, since an exact white balance or a vivid chromaticity is not required at the point corresponding to a luminance smaller than about 2 cd/cm$^2$, a calculation time may be reduced by selecting the point corresponding to a luminance smaller than about 2 cd/cm$^2$ and a gray level corresponding to the luminance as the inflection point.

Next, a normality or an abnormality is judged by measuring an optical property including the luminance of the display device 500 driven with the automatic code, and the display device 500 is classified according to the judgment result.

In the null setting step st10, an initial value and a driving IC equivalent resistance structure of the display device 500 of the sample are registered to the gamma setting system 100 (st12), and the control center 110 sets the driving of the display device 500 according to an initial code (st14).

For example, as shown in FIG. 9, the initial value may include a gamma voltage, a driving voltage of the emissive display panel 510, a TW target luminance, a TW target chromaticity, a gamma slope, a contrast ratio, an RGB inherent chromaticity and information of an emission type (a top emission type or a bottom emission type) of the display device 500. Here, each of the TW target luminance and the TW target chromaticity may be registered as a form of a tolerance range between a maximum deviation (max) and a minimum deviation (min) with respect to a specific value. The driving power may include a high level cell driving voltage (PVDD) and a low level cell driving voltage (PVEE) applied to an emitting element and a high level gamma source voltage (VDDH) and a low level gamma source voltage (VDDL) applied to the driving IC 520.

Here, the TW target luminance and the TW target chromaticity are predetermined as a demanding specification for the display device 500. In addition, since the RGB inherent chromaticity is a fixed value of a material for the emitting element of the emissive display panel 510, the RGB inherent chromaticity may be determined by a single optical measurement.

The equivalent resistance structure of the driving IC of the display device 500 may equivalently include a structure and a resistance of a ladder resistor of a gray level voltage generating unit of the driving IC for calculating the gamma register from the gamma voltage of the transfer function calculation.

The initial code may include a resolution, a driving signal and a driving condition where an operation setting of the driving IC is defined and the initial gamma register.

Next, the control center 110 measures an RGB optical property including the RGB luminance of the display device 500 of an RGB individual driving and a TW optical property including the TW luminance of the display device 500 of an RGB simultaneous driving with respect to all gray levels according to the initial code (st16).

Here, the RGB luminance of the RGB individual driving is each of red, green and blue luminance of the red, green and blue sub-pixels when one of emitting elements of the red, green and blue sub-pixels emits a light. The TW luminance of the RGB simultaneous driving is a total white luminance of the red, green and blue sub-pixels when all the emitting elements of the red, green and blue sub-pixels emit a light.

Next, the control center 110 calculates an IR drop RGB luminance by an IR drop calculation using the RGB luminance and the TW luminance with respect to all gray levels, and calculates an RGB efficiency with respect to all gray levels using the IR drop RGB luminance (st18). In addition, the control center 110 compiles and updates a lookup table with the RGB efficiency with respect to all gray levels (st20).

The IR drop RGB luminance by the IR drop calculation will be illustrated hereinafter.

In the display device 500, each of the plurality of pixels has a voltage drop (IR drop) due to a line resistance and each of the red, green and blue sub-pixels has a voltage drop (IR drop) due to a load resistance. As a result, each of the red, green and blue sub-pixels has a different IR drop occurs due to difference between a resistance of the RGB individual driving and a resistance of the RGB simultaneous driving (i.e., W driving).

Here, the IR drop due to the load resistance is a voltage drop by difference of a resistance when one of sub-pixels are driven and a resistance when at least two of the sub-pixels.

The theoretical equation $Y_W = Y_R + Y_G + Y_B$ such that a sum of the RGB luminance is the same as the TW luminance can not be applied due to the different IR drop between the RGB individual driving and the W driving. Accordingly, the measured luminance is required to be compensated by a reduced amount due to the IR drop to accurately calculate the RGB luminance by the tri-stimulus value calculation.

In FIGS. 10 and 11, for an $n^{th}$ gray level theoretical W luminance W_SUM(n) is defined by a sum of an R luminance LR(n) of the RGB individual driving, a G luminance LG(n) of the RGB individual driving and a B luminance LB(n) of the RGB individual driving. The measured real TW luminance LW(n) is a luminance of the W driving and is smaller than the theoretical W luminance W_SUM(n). As a result, an IR drop W luminance reduction amount IR_W(n) is a value [W_SUM(n)–LW(n)] obtained by subtracting the real TW luminance LW(n) from the theoretical W luminance W_SUM(n).

An R luminance IR_RED(n) of the W driving is a value [LR(n)–IR_R(n)] obtained by subtracting a R contribution IR_R(n) to the IR drop W luminance reduction amount from the R luminance LR(n) of the individual RGB driving. According to a proportional relation of the transfer function, the R contribution IR_R(n) to the IR drop W luminance reduction amount may be calculated as $$IR\_W(n) * \{c1R(n)/(c1R(n)+c1G(n)+c1B(n))\}.$$

An G luminance IR_GREEN(n) of the W driving is a value [LG(n)–IR_G(n)] obtained by subtracting a G contribution IR_G(n) to the IR drop W luminance reduction amount from the G luminance LG(n) of the individual RGB driving. According to a proportional relation of the transfer function, the G contribution IR_G(n) to the IR drop W luminance reduction amount may be calculated as $$IR\_W(n) * \{c1G(n)/(c1R(n)+c1G(n)+c1B(n))\}.$$

An B luminance IR_BLUE(n) of the W driving is a value [LB(n)–IR_B(n)] obtained by subtracting a B contribution IR_B(n) to the IR drop W luminance reduction amount from the B luminance LB(n) of the individual RGB driving. According to a proportional relation of the transfer function, the B contribution IR_B(n) to the IR drop W luminance reduction amount may be calculated as $$IR\_W(n) * \{c1B(n)/(c1R(n)+c1G(n)+c1B(n))\}.$$

An equation (1) used for calculation of a luminance with respect to a color and a gray level of the W driving is as follows.

$$IR\_W(n) = W\_SUM(n) - LW(n),$$

$$W\_SUM(n) = LR(n) + LG(n) + LB(n),$$

$$IR\_RED(n) = LR(n) - IR\_R(n),$$

$$IR\_GREEN(n) = LG(n) - IR\_G(n),$$

$$IR\_BLUE(n) = LB(n) - IR\_B(n),$$

$$IR\_R(n) = IR\_W(n) * c1R(n)/(c1R(n)+c1G(n)+c1B(n)),$$

$$IR\_G(n) = IR\_W(n) * c1G(n)/(c1R(n)+c1G(n)+c1B(n)),$$

$$IR\_B(n) = IR\_W(n) * c1B(n)/(c1R(n)+c1G(n)+c1B(n)),$$

$$c1R(n) = LR(n)/VR(n),$$

$$c1G(n) = LG(n)/VG(n),$$

$$c1B(n) = LB(n)NB(n) \quad \text{Equation (1):}$$

In the equation (1), n is a gray level between 0 to 255, IR_W(n) is a IR drop W luminance reduction amount of an $n^{th}$ gray level of a W driving, W_SUM(n) is a theoretical W luminance of an $n^{th}$ gray level, LW(n) is a measured TW luminance of an $n^{th}$ gray level of a W driving, LR(n) is a measured R luminance of an $n^{th}$ gray level of an RGB individual driving, LG(n) is a measured G luminance of an $n^{th}$ gray level of an RGB individual driving, LB(n) is a measured B luminance of an $n^{th}$ gray level of an RGB individual driving, IR_RED(n) is an IR drop R luminance of an $n^{th}$ gray level, IR_GREEN(n) is an IR drop G luminance of an $n^{th}$ gray level, IR_BLUE(n) is an IR drop B luminance of an $n^{th}$ gray level, IR_R(n) is an R contribution to an IR drop W luminance reduction amount of an $n^{th}$ gray level, IR_G(n) is an G contribution to an IR drop W luminance reduction amount of an $n^{th}$ gray level, IR_B(n) is an B contribution to an IR drop W luminance reduction amount of an $n^{th}$ gray level, c1R(n) is an IR drop R efficiency proportional factor of an $n^{th}$ gray level, c1G(n) is an IR drop G efficiency proportional factor of an $n^{th}$ gray level, c1G(n) is an IR drop G efficiency proportional factor of an $n^{th}$ gray level, VR(n) is an R driving voltage of an $n^{th}$ gray level, VG(n) is an G driving voltage of an $n^{th}$ gray level, and VB(n) is an B driving voltage of an $n^{th}$ gray level.

According to the equation (1), for an $n^{th}$ gray level, after W_SUM(n) is calculated by measuring the RGB luminance of the RGB individual driving and LW(n) is obtained by measuring the TW luminance of the W driving, IR_W(n) which is the maximum IR drop W luminance reduction amount when the RGB have the same luminance (W driving) is calculated from a difference of W_SUM(n) and LW(n). The maximum IR drop W luminance reduction amount occurs at a state where the W data having the same ratio of the RGB data is applied. For convenience of calculation, 8 gray levels of a representative inflection point among 256 gray levels may be an object of calculation. For example, the luminance reduction amount due to the IR drop may be compensated by measuring a luminance at at least two of gray levels of a critical point, an inflection point and a maximum point.

To obtain IR_R(n), IR_G(n) and IR_B(n) which are the RGB contribution to the maximum IR drop W luminance reduction amount IR_W(n), for each gray level, c1R, c1G and c1B which are the IR drop RGB efficiency proportional factor are calculated and c1R/(c1R+c1G+c1B), c1G/(c1R+c1G+c1B) and c1B/(c1R+c1G+c1B) which are the RGB contribution to IR_W(n) are calculated. c1R, c1G and c1B may be calculated for 8 gray levels of each RGB. Since a fixed source voltage (V, V1) of an initial state is presumed as a constant in an equation (13), c1R, c1G and c1B may be calculated by dividing an output measured luminance (A+B) by an input gamma voltage (a) according to the equation (13).

The RGB efficiency is calculated by using the IR drop R luminance IR_RED(n) of the W driving, the IR drop G luminance IR_GREEN(n) of the W driving and the IR drop B luminance IR_BLUE(n) of the W driving. Since the gamma register is set by comparing the RGB efficiency and the RGB target efficiency obtained through the tri-stimulus value calculation, the error due to the IR drop is prevented.

Next, the control center 110 calculates the RGB target luminance for each gray level by the tri-stimulus value calculation using the registered TW target luminance, the TW target chromaticity, the RGB inherent chromaticity and the driving condition (st22), and compiles the histogram by using or adding the calculated RGB target luminance as a histogram data (st24).

Here, the tri-stimulus value calculation includes a procedure of calculating the RGB target luminance from target values such as the TW luminance, the TW chromaticity and RGB inherent chromaticity according to an equation (2) to an equation (10).

The equation (2) on a tri-stimulus value $(X_R, X_G, X_B, X_W, Y_R, Y_G, Y_B, Y_W, Z_R, Z_G, Z_B, Z_W)$ of the RGBW is obtained from a correlation that a sum of the RGB becomes the W according to an additive color synthesis calculation. The equation (4) to the equation (7) on the tri-stimulus value $(X_R, X_G, X_B, X_W, Y_R, Y_G, Y_B, Y_W, Z_R, Z_G, Z_B, Z_W)$ and chromaticity $(x_R, x_G, x_B, x_W, y_R, y_G, y_B, y_W, z_R, z_G, z_B, z_W)$ of the RGBW are obtained by applying the equation (1) to the equation (3) on a tri-stimulus value (X, Y, Z) and a chromaticity (x, y, z). In addition, the RGB chromaticity $(x_R, x_G, x_B, x_W, y_R, y_G, y_B, y_W, z_R, z_G, z_B, z_W)$ of an inherent value are calculated by a single optical measurement, and the equation (8) to the equation (10) on the RGB target luminance $(Y_R, Y_G, Y_B)$ are obtained by applying the RGB chromaticity to the equation (4) to the equation (10).

$$X_W = X_R + X_G + X_B, Y_W = Y_R + Y_G + Y_B,$$
$$Z_W = Z_R + Z_G + Z_B \quad \text{Equation (2)}$$

$$x = X/(X+Y+Z), y = Y/(X+Y+Z),$$
$$z = Z/(X+Y+Z), 1 = x+y+z \quad \text{Equation (3)}$$

$$X_W = x_W * (Y_W / y_W), Y_W = Y_W,$$
$$Z_W = (1 x_W y_W) * (Y_W / y_W) \quad \text{Equation (4)}$$

$$X_R = x_R * (Y_R / y_R), Y_R = Y_R,$$
$$Z_R = (1 x_R y_R) * (Y_R / y_R) \quad \text{Equation (5)}$$

$$X_R = x_G * (Y_G / y_G), Y_G = Y_G,$$
$$Z_G = (1 x_G y_G) * (Y_G / y_G) \quad \text{Equation (6)}$$

$$X_B = x_B * (Y_B / y_B), Y_B = Y_B,$$
$$Z_B = (1 x_B y_B) * (Y_B / y_B) \quad \text{Equation (7)}$$

$$Y_B = Y_W * \begin{bmatrix} \frac{1-x_W-y_W}{y_W} - \frac{1-x_R-y_R}{y_R} & \frac{x_W}{y_W} - \frac{x_R}{y_R} \\ \frac{1-x_G-y_G}{y_G} - \frac{1-x_R-y_R}{y_R} & \frac{x_G}{y_G} - \frac{x_R}{y_R} \\ \frac{1-x_B-y_B}{y_B} - \frac{1-x_R-y_R}{y_R} & \frac{x_B}{y_B} - \frac{x_R}{y_R} \\ \frac{1-x_G-y_G}{y_G} - \frac{1-x_R-y_R}{y_R} & \frac{x_G}{y_G} - \frac{x_R}{y_R} \end{bmatrix} \quad \text{Equation (8)}$$

$$Y_G = Y_W * \begin{bmatrix} \frac{x_W}{y_W} - \frac{x_R}{y_R} \\ \frac{x_G}{y_G} - \frac{x_R}{y_R} \end{bmatrix} - Y_B * \begin{bmatrix} \frac{x_B}{y_B} - \frac{x_R}{y_R} \\ \frac{x_G}{y_G} - \frac{x_R}{y_R} \end{bmatrix} \quad \text{Equation (9)}$$

$$Y_R = Y_W - Y_B - Y_G \quad \text{Equation (10)}$$

As a result, the RGB target luminance is calculated from the TW luminance, the TW chromaticity and the RGB chromaticity by the tri-stimulus value calculation.

Next, the control center 110 calculates a null gamma register by the transfer function calculation using the RGB efficiency and the RGB target luminance with respect to all gray levels (st26), and generates a null code including a null gamma register (st28).

Here, the transfer function calculation includes a procedure of setting a gamma resistance and a gamma voltage satisfying the target value such as the RGB luminance, the TW luminance, the RGB chromaticity and the TW chromaticity by using the equation (11) to the equation (14).

$$y = V - (a*(x/dx)^{1/r} + b) \quad \text{Equation (11):}$$

$$Y = A*(x/dx)^r + B \quad \text{Equation (12):}$$

$$c1 = (A+B)*V1/(a*V) \quad \text{Equation (13):}$$

$$c2 = B/c1 + b \quad \text{Equation (14):}$$

In the equation (11) to the equation (14), y is a gamma voltage of the driving IC 250, V is a bias voltage of the driving IC (520) which is a difference between a high level gamma source voltage VDDH and a low level gamma source voltage VDDL, a is a gain (amplitude) of a voltage transfer function, b is an offset of the voltage transfer function, 1/r is a slope of the voltage transfer function (i.e., a slope of a gamma voltage characteristic curve), x is a gray level, dx is a total number of all gray levels, Y is a luminance of the emissive display panel 510, A is a gain (amplitude) of a luminance transfer function, B is an offset of the luminance transfer function, r is a slope of the luminance transfer function (i.e., a slope of a luminance characteristic curve), c1 is a efficiency proportional factor, V1 is a driving voltage of an emitting element which is a difference between a high level cell driving voltage PVDD and a low level cell driving voltage PVEE, and c2 is a critical point proportional factor.

In the automatic setting step st50, the control center 110 sets a driving of the display device 500 according to the null code including the null gamma register (st52), and sets the RGB target luminance (st54).

Next, the control center 110 calculates the inflection point (gray level) in reference to the histogram, and measures an optical property of the inflection point and the maximum point including a luminance at the inflection point (RGB luminance and TW luminance) and a luminance at the maximum point (RGB luminance and TW luminance) of the display device 500 driven with the null code (st58).

Here, the gray level of the emitting element at the inflection point has a correlation with the gray level at an efficiency change point. The histogram is compiled by selecting a reference efficiency data from a plurality of efficiency data (efficiency curve) of all gray levels used for updating the lookup table and comparing the efficiency data of all gray levels calculated from the null setting step st10 with the reference efficiency data.

For example, as shown in FIG. 12, an RGB histogram may be complied by setting a reference efficiency data as "0" and by classifying the efficiency data of all gray levels into a positive (+) and a negative (−) according to a degree of correlation with the reference efficiency data. The inflection point (gray level) may be calculated from the RGB histogram.

Next, the control center 110 calculates an IR drop RGB luminance of the inflection point and the maximum point by performing the IR drop calculation using the measured inflection point luminance and the measured maximum point luminance, and calculates an inflection point efficiency and a maximum point efficiency from the IR drop RGB luminance. In addition, the control center 110 calculates a critical point (luminance and gray level) and a critical point efficiency by calculating a critical point luminance from the maximum luminance and the contrast ratio using an equation (15) (st60).

critical point luminance=maximum point luminance/
    contrast ratio    Equation (15):

Next, the control center 110 calculates the efficiencies of the points other than the critical point, the inflection point and the maximum point in reference to the lookup table according to the critical point efficiency, the inflection point efficiency and the maximum point efficiency (st62) to calculate the RGB efficiency with respect to all gray levels (st64).

The lookup table may include a data of an efficiency tendency according to the luminance of the critical point, the inflection point and the maximum point, and may include a different efficiency tendency data according to a kind of the display device 500. For example, the lookup table may include efficiency tendency data which are respectively applied to a top emission type display device and a bottom emission type display device.

Next, the control center 110 calculates an automatic gamma register by the transfer function calculation using the calculated RGB efficiency of all gray levels (st66), and generates an automatic code including an automatic gamma register (st68).

Next, the control center 110 measures a luminance of the display device 500 driven with the automatic code, and judges the display device 500 as normality of abnormality according to whether the measured luminance satisfies the target value or not (st70).

When the display device 500 is judged as normality, the histogram is updated by adding the efficiency data of all gray levels to the histogram (st72), and the null code or the automatic code is stored in the driving IC of the display device 500 (st74).

In the automatic setting step st50, as shown in FIG. 13, the inflection point gray level is calculated in reference to the histogram, and the optical property of the inflection point and the maximum point is measured. In addition, a gray level and a luminance of the critical point are calculated from the maximum point luminance and the contrast ratio, and the RGB efficiency of all gray levels is calculated in reference to the lookup table according to the inflection point efficiency and the maximum point efficiency calculated from the measured critical point luminance and the measured maximum point luminance. As a result, the automatic gamma register for a new sample is calculated.

Further, a luminance curve is calculated by driving the new sample with the automatic gamma register, and the calculated luminance curve is compared with a luminance curve for the reference sample. When the comparison result has an error in the reference error range, the display device 500 is judged as normality. When the comparison result has an error out of the reference error range, the display device 500 is judged as abnormality.

In the first embodiment, after the IR drop RGB luminance and the RGB luminance are calculated (st18), the RGB target luminance is calculated by the tri-stimulus value calculation. In another embodiment, after the RGB target luminance is calculated by the tri-stimulus value calculation, the IR drop RGB luminance and the RGB luminance are calculated.

Although each pixel of the emissive display panel 510 has red, green and blue sub-pixels in the first embodiment of the present invention, the gamma setting method of the present invention may be applied to the emissive display panel where each pixel has red, green, blue and white sub-pixels in another embodiment.

FIG. 14 is a flow chart illustrating a gamma setting method of a display device according to a second embodiment of the present invention. Illustration on a part which is the same as that of the first embodiment will be omitted.

In FIG. 14, a gamma setting method of a display device according to a second embodiment of the present invention includes a null setting step st110 performed under a new environment or under an identical environment regularly/irregularly and an automatic setting step st150 performed under an identical environment.

The gamma setting system according to a second embodiment of the present invention selects and performs one of the null setting step st110 and the automatic setting step st150, or performs both of the null setting step st110 and the automatic setting step st150. When both of the null setting step st110 and the automatic setting step st150 are performed, the automatic setting step st150 may be performed after the null setting step st110.

The null setting step st110 and the automatic setting step st150 may be performed using an RGB luminance, a PW luminance and a TW luminance by a direct measurement of the optical measuring unit 130 with respect to an identical input gamma power. The lookup table may be updated when the null setting step st110 is repeatedly performed under an identical condition, and the histogram may be updated for the display device judged as normality when the automatic setting step st150 is performed.

In the null setting step st110, a ratio (PW:W ratio) of a PW luminance and a W luminance (W individual driving), an IR drop PW luminance, an IR drop RGB luminance and an RGB efficiency with respect to all gray levels is calculated by a measurement of an RGBW luminance (RGBW individual driving) with respect to all gray levels, a PW luminance (RGB simultaneous driving) and a TW luminance (RGBW simultaneous driving), and an RGB target luminance with respect to all gray levels is calculated by a tri-stimulus value calculation using a registered value and an RGB chromaticity. In addition, a null gamma register is calculated by a transfer function calculation, and a null code including the null gamma register is generated.

In the automatic setting step st150, an inflection point is calculated by using a histogram, and an efficiency with respect to all gray levels is calculated by a measurement of the RGB luminance, the PW luminance and the TW luminance with respect to gray levels of the inflection point and a maximum point and the lookup table. As a result, an automatic code including an automatic gamma register is generated.

Next, a normality or an abnormality is judged by measuring an optical property including the luminance of the display device 500 driven with the automatic code, and the display device 500 is classified according to the judgment result.

In the null setting step st110, an initial value and a driving IC equivalent resistance structure of the display device 500 of the sample are registered to the gamma setting system (st112), and the control center sets the driving of the display device according to an initial code (st114).

Here, the initial value may include a gamma voltage, a driving voltage of the emissive display panel, a TW target luminance, a TW target chromaticity, a gamma slope, a contrast ratio, an RGB inherent chromaticity and information of an emission type (a top emission type or a bottom emission type) of the display device. Each of the TW target luminance and the TW target chromaticity may be registered as a form of a tolerance range between a maximum deviation (max) and a minimum deviation (min) with respect to a specific value. The driving power may include a high level cell driving voltage (PVDD) and a low level cell driving voltage (PVEE) applied to an emitting element and a high level gamma source voltage (VDDH) and a low level gamma source voltage (VDDL) applied to the driving IC.

The TW target luminance and the TW target chromaticity are predetermined as a demanding specification for the display device. In addition, since the RGB inherent chromaticity is a fixed value of a material for the emitting element of the emissive display panel, the RGB inherent chromaticity may be determined by a single optical measurement.

The equivalent resistance structure of the driving IC of the display device may equivalently include a structure and a resistance of a ladder resistor of a gray level voltage generating unit of the driving IC for calculating the gamma register from the gamma voltage of the transfer function calculation.

The initial code may include a resolution, a driving signal and a driving condition where an operation setting of the driving IC is defined and the initial gamma register.

Next, the control center measures an RGBW optical property including the RGBW luminance of the display device of an RGBW individual driving, a PW optical property including a PW (partial white) luminance of the display device of an RGB simultaneous driving and a TW optical property including the TW (total white) luminance of the display device of an RGBW simultaneous driving with respect to all gray levels according to the initial code (st116).

Here, the RGBW luminance of the RGBW individual driving is each of red, green, blue and white luminance of the red, green, blue and white sub-pixels when one of emitting elements of the red, green, blue and white sub-pixels emits a light. The PW luminance of the RGB simultaneous driving is a partial white luminance of the red, green and blue sub-pixels when the emitting elements of the red, green and blue sub-pixels except for the white sub-pixel emit a light. The TW luminance of the RGB simultaneous driving is a total white luminance of the red, green, blue and white sub-pixels when all the emitting elements of the red, green, blue and white sub-pixels emit a light.

Next, the control center calculates a contribution of the PW luminance to the TW luminance according to a PW:W ratio by using the measured W luminance, the measured PW luminance and the measured TW luminance with respect to all gray levels, and calculates an IR drop PW luminance by an IR drop calculation. In addition, the control center calculates an IR drop RGB luminance by using the measured RGB luminance and the calculated IR drop PW luminance, and calculates an RGB efficiency with respect to all gray levels using the IR drop RGB luminance (st118). Further, the control center compiles and updates a lookup table with the RGB efficiency with respect to all gray levels (st120).

Here, the TW luminance of the RGBW simultaneous driving may be expressed as a sum ((PW luminance)+(W luminance)) of the PW luminance of the RGB simultaneous driving and the W luminance of the W individual driving. As a result, the PW luminance of the RGB simultaneous driving may be calculated by subtracting the W luminance from the TW luminance as in an equation (16).

$$(PW \text{ luminance}) = (TW \text{ luminance}) - (W \text{ luminance}) \quad \text{Equation (16):}$$

The W luminance is a luminance of a white color driven directly by the white sub-pixel. The white sub-pixel has an inherent W chromaticity and an inherent W luminance, and the W luminance is a fixed value whose ratio to the TW luminance is determined according to a converting reference from an RGB data to an RGBW data. The converting reference varies according to a model or a manufacturer. Although the W luminance has a correlation with the RGB data, the W luminance has nothing to do with the gamma reference voltage and the PW luminance. Accordingly, after the W luminance is registered at an initial stage of the gamma setting step, the W luminance may be used as a fixed value in calculation of the IR drop RGB luminance or the tri-stimulus value calculation.

As a result, the PW:W ratio can be calculated from the measured PW luminance and the measured W luminance, and the PW luminance can be divided from the TW luminance.

Here, since the W luminance corresponds to the RGBW individual driving, the reduction of the W luminance due to the load resistance IR drop does not occur and the W luminance is obtained by a direct measurement. Since the reduction of the PW luminance due to a load resistance IR drop occurs, the contribution is calculated from a difference between the TW luminance and the sum of the PW luminance and the W luminance. Accordingly, the TW luminance is divided into the W luminance and the PW luminance.

The IR drop PW luminance is calculated from the measured W luminance, the measured PW luminance and the measured TW luminance using the equation (1). (In the equation (1), W is replaced by TW, R is replaced by PW, G is replaced by W, and B is removed)

Next, the control center calculates the IR drop RGB luminance from the measured RGB luminance and the calculated IR drop PW luminance using the equation (1), and calculates the RGB efficiency with respect to all gray levels using the IR drop RGB luminance.

In the subsequent tri-stimulus value calculation, the control center calculates a virtual TW RGB luminance (TWR, TWG, TWB) from the TW luminance, the TW chromaticity and the RGB chromaticity according to the equation (8) to the equation (10), and calculates a virtual W RGB luminance (WR, WG, WB) from the W luminance, the W chromaticity and the RGB chromaticity according to the equation (8) to the equation (10). In addition, the control center calculates the RGB target luminance (PWR, PWG, PWB) by subtracting the calculated W RGB luminance (WR, WG, WB) from the calculated TW RGB luminance (TWR, TWG, TWB) (st122) ((PWR, PWG, PWB)=(TWR-WR), (TWG-WG), (TWB-WB)), and compiles the histogram by using or adding the calculated RGB target luminance as a histogram data (st124).

Next, the control center calculates a null gamma register by the transfer function calculation using the RGB efficiency and the RGB target luminance with respect to all gray levels (st126), and generates a null code including a null gamma register (st128).

In the automatic setting step st150, the control center sets a driving of the display device according to the null code including the null gamma register (st152), and sets the RGB target luminance (st154).

Next, the control center calculates the inflection point (gray level) in reference to the histogram, and measures an optical property of the inflection point and the maximum point including a luminance at the inflection point (RGBW luminance and TW luminance) and a luminance at the maximum point (RGBW luminance and TW luminance) of the display device driven with the null code (st158).

Next, the control center calculates the contribution of the PW luminance to the TW luminance according to the PW:W ratio using the measured inflection point luminance and the measured maximum point luminance, and calculates an IR drop RGB luminance of the inflection point and the maximum point by performing the IR drop calculation. In addition, the control center calculates an inflection point efficiency and a maximum point efficiency from the IR drop RGB luminance, and calculates a critical point (luminance and gray level) and a critical point efficiency by calculating a critical point luminance from the maximum luminance and the contrast ratio using an equation (15) (st160).

Next, the control center calculates the efficiencies of the points other than the critical point, the inflection point and the maximum point in reference to the lookup table according to the critical point efficiency, the inflection point efficiency and the maximum point efficiency (st162) to calculate the RGB efficiency with respect to all gray levels (st64).

The lookup table may include a data of an efficiency tendency according to the luminance of the critical point, the inflection point and the maximum point, and may include a different efficiency tendency data according to a kind of the display device. For example, the lookup table may include efficiency tendency data which are respectively applied to a top emission type display device and a bottom emission type display device.

Next, the control center calculates an automatic gamma register by the transfer function calculation using the calculated RGB efficiency of all gray levels (st166), and generates an automatic code including an automatic gamma register (st168).

Next, the control center measures a luminance of the display device driven with the automatic code, and judges the display device as normality or abnormality according to whether the measured luminance satisfies the target value or not (st170).

When the display device is judged as normality, the histogram is updated by adding the efficiency data of all gray levels to the histogram (st172), and the null code or the automatic code is stored in the driving IC of the display device (st174).

In the automatic setting step st150, the inflection point gray level is calculated in reference to the histogram, and the optical property of the inflection point and the maximum point is measured. In addition, a gray level and a luminance of the critical point are calculated from the maximum point luminance and the contrast ratio, and the RGB efficiency of all gray levels is calculated in reference to the lookup table according to the inflection point efficiency and the maximum point efficiency calculated from the measured critical point luminance and the measured maximum point luminance. As a result, the automatic gamma register for a new sample is calculated.

Further, a luminance curve is calculated by driving the new sample with the automatic gamma register, and the calculated luminance curve is compared with a luminance curve for the reference sample. When the comparison result has an error in the reference error range, the display device is judged as normality. When the comparison result has an error out of the reference error range, the display device is judged as abnormality.

In the first and second embodiments, the emissive display panel is not divided into blocks, and the gamma register is set by using the same transfer function, the same lookup table and the same histogram. In another embodiment, the emissive display panel may be divided into a plurality of blocks, and the gamma register may be set by using a different transfer function.

FIG. 15 is a view showing a gamma setting system of a display device according to a second embodiment of the present invention. Illustration on a part which is the same as that of the first embodiment will be omitted.

In FIG. 15, a gamma setting system 600 according to a third embodiment of the present invention includes a control center 610, a signal processing unit 620, a current processing center 630, a sample supporting unit 640 and an optical measuring unit 650.

The sample supporting unit 640 fixes a position of the emissive display panel (including the driving IC) for protection. In addition, the sample supporting unit 640 transmits the test signal of the signal processing center 620 to the emissive display panel, and transmits the measured signal such as the photo current of the emissive display panel to the current processing center 630. For example, a jig or a pallet may be used as the sample supporting unit 640.

The sample supporting unit 640 may include a measuring device such as a sensor 642 in periphery of the emissive display panel, and the sensor 642 may generate a photo current corresponding to a luminance of a light emitted from the emissive display panel.

The display device 660 includes an emissive display panel divided into first to fourth blocks, first and second gate driving IC 662, and first and second data driving IC 664. The first gate driving IC applies a gate signal to the first and third blocks, and the second gate driving IC applies the gate signal to the second and fourth blocks. The first data driving IC applies a data signal to the first and second blocks, and the second data driving IC applies the data signal to the third and fourth blocks.

The optical measuring unit 650 may include four units corresponding to the first to fourth blocks. In another embodiment, a single optical measuring unit may move to measure the optical property of the first to fourth blocks sequentially.

Here, the signal processing center 620 sets a gamma register of each of the first to fourth blocks of the emissive display panel using a different (independent) transfer function. To minimize a difference in display quality between blocks or a border line, the signal processing center 620 calculates a minimum value among the maximum point luminances of the first to fourth blocks, and decreases the maximum point luminances of the first to fourth blocks to the calculated minimum value. In addition, the signal processing center 620 calculates a maximum value among the critical point luminances of the first to fourth blocks, and increases the critical point luminances of the first to fourth blocks to the calculated maximum value. As a result, a maximum point luminance and a critical point luminance are calculated.

When the properties of the first to fourth blocks are adjusted, the same input data is supplied to the first to fourth blocks and the luminance is measured. Since the minimum efficiency or a maximum efficiency in an adjustable range of the same gray level is used for all blocks, the deviation between blocks is adjusted such that all blocks are within the same adjusting range.

The property adjusting method for blocks of the third embodiment may be applied to the first and second embodiments.

The invention claimed is:

1. A gamma setting system for a display device which performs a null setting step setting a null gamma register of the whole gray levels of the display device from RGB luminance and TW luminance of the whole gray levels as an input condition and an automatic setting step setting an automatic gamma register of the whole gray levels of the display device from a lookup table and RGB luminance and TW luminance of at least two gray levels of the display device as an input condition, comprising:

an optical measuring unit measuring an optical property of a display device including an emissive display panel having red, green and blue sub-pixels;

a control center performing a null setting step and an automatic setting step using the optical property of the display device;

a system driving unit transmitting a result data between the display device and the control center;

a first display unit displaying a TW target luminance, a TW target chromaticity and an RGB inherent chromaticity registered for the null setting step and the automatic setting step, a graph of a gray level voltage and a luminance of an RGB and a TW with respect to a gray level, a high level cell driving voltage (PVDD) and a low level cell driving voltage (PVEE) applied to an emitting element, a high level gamma source voltage (VDDH) and a low level gamma source voltage (VDDL) applied to a driving IC, a gamma slope, a contrast ratio, a driving type of the system, a gamma setting, an instruction on an execution command, and a progress state of the display device, wherein the control center:
in the null setting step, calculates an IR drop RGB luminance based on a voltage drop due to a driving resistance of the display device by measuring an RGB luminance and a TW luminance of all gray levels of the display device, calculates an RGB efficiency of all gray levels from the IR drop RGB luminance, calculates an RGB target luminance from the TW target luminance, the TW target chromaticity and the RGB inherent chromaticity through a tri-stimulus value calculation, and generates a null code including a null gamma register from the RGB efficiency of all gray levels through a transfer function calculation; and
in the automatic setting step, calculates the RGB efficiency of at least two gray levels from the RGB luminance and the TW luminance of the at least two gray levels of the display device, calculates the RGB efficiency of gray levels other than the at least two gray levels in reference to a lookup table, and generates an automatic code including an automatic gamma register from the RGB efficiency of the at least two gray levels and the RGB efficiency of the gray levels other than the at least two gray levels, and wherein the system driving unit transmits a command and an execution result between the control center and a peripheral device including the first display unit, a second display unit, a communicating unit, a process result storing unit, an operation controlling unit, a carrying unit, a defect managing unit, a power supplying unit, a current processing center and a sample supporting unit.

2. The gamma setting system of claim 1, wherein the optical measuring unit measures an average luminance and an average chromaticity of a section of the display device,
wherein the optical measuring unit detects an information including a luminance and a chromaticity among the optical property of a test pattern and provides the information to the null setting step and the automatic setting step,
wherein a number of the optical measuring unit is equal to or greater than a number of the display device performing the null setting step and the automatic setting step simultaneously, and
wherein the optical measuring unit is installed such that a light emitted from the display device is directly inputted to the optical measuring unit.

3. The gamma setting system of claim 2, wherein the optical measuring unit performs a gamma setting to the display device for a predetermined time period with spaced apart from the display device while the display device is transferred by a conveyor, and
wherein a transfer speed of the display device by the conveyor is the same as a gamma setting speed of the gamma setting system.

4. The gamma setting system of claim 2, wherein the test pattern is one of a pattern having a gray level number corresponding to a data bit used for an image display of the display device and a pattern of a dithering type having an increased gray level number by adding a low bit to the data bit to increase an accuracy of the RGB efficiency due to an expansion of the gray level number.

5. The gamma setting system of claim 1, wherein the first display unit displays a chromaticity coordinate graph including the TW target luminance, the TW target chromaticity and the RGB inherent chromaticity, a measured data of a luminance and a chromaticity according to a gray level, a graph of a gray level voltage and a luminance according to a gray level, a command inputted and outputted by a manual adjustment, a setting menu of an operation state, selection of connection with an external device, a setting state of an initial environment, and an operation command, a procedure state and a processing result of the control center.

6. The gamma setting system of claim 1, wherein the control center:
selectively performs one of the null setting step and the automatic setting step, or performs both of the null setting step and the automatic setting step;
when both of the null setting step and the automatic setting step are performed, performs the automatic setting step after the null setting step is performed;
performs the null setting step and the automatic setting step using the RGB luminance and the TW luminance by a direct measurement of the optical measuring unit with respect to an identical input gamma power;
when the null setting step is repeatedly performed under an identical condition, updates the lookup table; and
when the automatic setting step is performed, updates a histogram for the display device judged as a normality.

7. The gamma setting system of claim 6, wherein the control center:
in the null setting step, generates the null code by a measurement of a luminance and a chromaticity of all gray levels of the display device;
in the automatic setting step, generates the automatic code by a measurement of a luminance and a chromaticity of at least two gray levels of the display device; and
has a sequential procedure without a re-performance due to a feedback by ending all processes for a gamma setting with judging a normality or an abnormality of the display device.

8. The gamma setting system of claim 6, wherein the control center performs the null setting step and the automatic setting step using an initial value, an equivalent resistance structure of a driving IC of the display device and an initial code,
wherein the initial value includes a gamma voltage, a driving voltage of the emissive display panel, the TW target luminance, the TW target chromaticity, the gamma slope, the contrast ratio, the RGB inherent chromaticity and an emission type of the display device,
wherein the equivalent resistance structure of the driving IC equivalently includes a structure and a resistance of a ladder resistor of a gray level voltage generating unit of the driving IC for calculating a gamma register from the gamma voltage calculated through the transfer function calculation, and
wherein the initial code includes a resolution, a driving signal and a driving condition where an operation setting of the driving IC is defined and an initial gamma register.

9. The gamma setting system of claim 6, for obtaining a maximum setting range based on a proportional relation of the RGB efficiency and a change range of a gamma voltage in the tri-stimulus value calculation,
wherein each of the TW target luminance and the TW target chromaticity is registered to have a tolerance range between a maximum deviation and a minimum deviation, and
wherein the control center selects a maximum value of a voltage change range of a driving power from the tolerance range as the TW target luminance and the TW target chromaticity by comparing a relative difference of the RGB efficiency at a maximum voltage due to the driving source and a difference of a ratio of the RGB target luminance due to the tri-stimulus value calculation.

10. The gamma setting system of claim 6, wherein the control center compiles the lookup table with a different data for the display device of a top emission type and the display device of a bottom emission type having a different optical property and a different efficiency, and
wherein the optical measuring unit is disposed at a different position.

11. The gamma setting system of claim 1, wherein the control center:
utilizes the null code calculated through the null setting step for the automatic setting step, or stores the null code calculated through the null setting step in the display device;
calculates a lookup table data and a histogram data through the null setting step; and
updates the lookup table by repeatedly performing the null setting step regularly or irregularly under an identical environment.

12. The gamma setting system of claim 11, wherein a voltage drop due to a driving resistance of the display device includes a voltage drop due to a line resistance of the red, green and blue sub-pixels according to a position and a voltage drop due to a load resistance of an individual driving of the red, green and blue sub-pixels, and
wherein the IR drop RGB luminance is calculated by measuring the RGB luminance and the TW luminance of a logical number of cases of an additive color synthesis at a state where an identical voltage is applied and by applying the RGB efficiency to a difference between a sum of the RGB luminance and the TW luminance.

13. The gamma setting system of claim 11, wherein the RGB target luminance is calculated by constituting a correlation equation with a tri-stimulus value calculation equation of an XYZ coordinate system of CIE and a number of cases of an additive color synthesis of an RGB coordinate system of CIT, by applying the RGB inherent chromaticity of an intrinsic property of a material as a fixed value to the correlation equation, and by applying a correlation of an additive color synthesis such that a sum of the IR drop RGB luminance becomes the TW luminance.

14. The gamma setting system of claim 11, wherein the control center uses at least one of the lookup table, a histogram and the RGB target luminance in the automatic setting step.

15. The gamma setting system of claim 1, wherein the control center:
performs the automatic setting step using the null code;
stores the automatic code calculated through the automatic setting step in the display device;
updates a histogram by performing the automatic setting step; and
repeatedly performs the automatic setting step under an identical environment.

16. The gamma setting system of claim 1, wherein the control center, in the automatic setting step:
calculates a critical point efficiency by calculating a critical point luminance from a measured maximum point luminance of the display device and the registered contrast ratio, or calculates the critical point efficiency by directly measuring the critical point luminance;

selects an inflection point in reference to a histogram, or selects a local maximum of an efficiency variation rate corresponding to a luminance smaller than 2 cd/m² as the inflection point; and obtains a total efficiency relation with the critical point efficiency by calculating an inflection point efficiency and a maximum point efficiency from a measured inflection point luminance and the measured maximum point luminance.

17. The gamma setting system of claim 16, wherein the control center:
updates the histogram using a data of the RGB efficiency of all gray levels of a plurality of display devices calculated from the automatic setting step; and
updates the lookup table by performing the null setting step regularly or irregularly.

18. The gamma setting system of claim 1, wherein the control center:
calculates a gamma voltage of the RGB target luminance due to the RGB efficiency after the null setting step and the automatic setting step are performed; and
calculates an input voltage of all gray levels by applying the RGB efficiency to the RGB target luminance through the transfer function calculation after a structure of a ladder resistor is equivalently registered to a transfer function at an initial stage, and calculates the null code and the automatic code including the null gamma register and the automatic gamma register after a value of the ladder resistor satisfying the input voltage is set as the null gamma register and the automatic gamma register.

19. The gamma setting system of claim 1, wherein the control center:
judges the display device as a normality or an abnormality according to the null code or the automatic code after the null setting step or the automatic setting step is performed;
classifies the display device according to a judgment result of the normality, or the abnormality or classifies the display device according to an identification code after the display device is judged, or after a gamma setting of the display device is completed;
updates a histogram using an information of an inflection point of the display device of the normality; and
stores the null code or the automatic code in a driving IC of the display device of the normality.

20. The gamma setting system of claim 1, wherein the system driving unit comprises:
a signal processing center transmitting an operation command signal of the control center to the display device, converting an electrical signal of an operation result of the display device to a digital data, and transmitting the digital data to the control center;
an initial code memory storing an initial code used in the null setting step;
a null code memory storing the null code used in the automatic setting step;
a lookup table memory storing a lookup table generated in the null setting step;
a histogram memory storing a histogram data generated in the null setting step;
a test signal generating unit generating a test signal used in the null setting step and the automatic setting step and transmitting the test signal to the display device;

a code signal generating unit generating a signal corresponding to a gamma register of the initial code and the null code and transmitting the signal to the display device;
an MTP code downloading unit downloading the null code and the automatic code and transmitting the null code and the automatic code to the display device;
a system power generating unit generating an supplying a voltage for the signal processing center of the system driving unit;
a panel power generating unit generating and supplying a power for the display device;
a current consumption detecting unit detecting a current consumption from a power supplied to the display device;
a first interface transmitting a signal between the control center and the system driving unit; and
a second interface transmitting a signal between the system driving unit and the display device.

21. The gamma setting system of claim 1, wherein the second display unit displays a state of a start, a progress and an end of the gamma setting system or a process result for an emergency,
wherein the communicating unit transmitting a signal between an external automation system and the gamma setting system,
wherein the processing result storing unit cumulatively stores a process result of the null setting step and the automatic setting step,
wherein the operation controlling unit controls a start, a progress and an end of the gamma setting system, a setting of an automation and a manual, and an emergency stop,
wherein the carrying unit inputs or outputs the display device between an external conveyor and the gamma setting system,
wherein the defect managing unit judges the display device as a normality or an abnormality, and stores an abnormal part code or an abnormal display device according to a judgment result,
wherein the power supplying unit generates and supplies a power for the gamma setting system,
wherein the current processing center modifies a deviation using a current consumption detected from the power supplied to the display device and a photo current corresponding to a luminance of a light emitted from the display device, and
wherein the sample supporting unit fixes the display device, transmits a test signal of the system driving unit to the display device, and transmits the photo current of the display device to the current processing center.

22. The gamma setting system of claim 1, wherein the current processing center directly measures an input current consumption and an output photo current,
wherein the control center proportionally calculates the RGB efficiency of all gray levels using a correlation of the input current consumption and the output photo current,
wherein a measuring device of the sample supporting unit disposed at a periphery of a pixel of the display device transmits the photo current to the system driving unit, is used as an auxiliary means using a difference of a proportional property to the optical measuring unit, and includes a photodiode by wavelength to directly measure a light, and
wherein the control center modifies a deviation using the current consumption detected from a power supplied to the display device and the photo current corresponding to a luminance of a light emitted from the display device.

23. The gamma setting system of claim 1, wherein an aging step is performed before the null setting step and the automatic setting step, and
wherein the null setting step and the automatic setting step are performed by commonly using a signal supplying line and a jig of the aging step.

24. The gamma setting system of claim 23, wherein the display device is disposed on and fixed to the sample supporting unit during the aging step,
wherein the display device is disposed on and fixed to the sample supporting unit during the null setting step and the automatic setting step, and
wherein a system for performing the null setting step and the automatic setting step is disposed in a system for performing the aging step.

25. The gamma setting system of claim 1, wherein the sample supporting unit comprises:
a fixing device for fixing the display device using a suction by a vacuum, an elasticity by a spring or a gravity by a weight;
a circuit part and a power part for transmitting a test signal, the null code and the automatic code to the display device;
a probe connector having a probe type or a contact type for connection with the display device; and
a measuring device for measuring a property of the display device.

26. The gamma setting system of claim 1, wherein when the display device has a flexible type, the sample supporting unit maintains a balance of the display device by sucking the display device with a vacuum chuck at a rear surface of the display device.

27. The gamma setting system of claim 1, wherein the emissive display panel is divided into a plurality of blocks,
wherein the optical measuring unit determines block-based average luminance and average chromaticity of the emissive display panel,
wherein the display device further comprises a plurality of driving ICs supplying a data signal to the plurality of blocks, respectively, and
wherein the control center generates the null code and the automatic code using a different transfer function for the plurality of blocks, and applies the null code and the automatic code to the plurality of driving ICs.

28. The gamma setting system of claim 27, wherein the plurality of blocks are independently and divisionally driven,
wherein an image signal having an identical gray level is applied to the plurality of blocks,
wherein the optical measuring unit measures a luminance of each of the plurality of blocks, and
wherein a gamma setting is independently performed for the plurality of blocks.

29. The gamma setting system of claim 27, wherein the control center, in the null setting step and the automatic setting step:
uses a minimum value among maximum point luminances of the plurality of blocks as a common maximum point luminance for the plurality of blocks;
uses a maximum value among critical point luminances of the plurality of blocks as a common critical point luminance for the plurality of blocks; and uses a minimum efficiency or a maximum efficiency so that each of the plurality of blocks can have an adjustable range of a same gray level.

30. A gamma setting system for a display device, comprising:
an optical measuring unit measuring an optical property of a display device including an emissive display panel having red, green and blue sub-pixels;
a control center performing a null setting step and an automatic setting step using the optical property of the display device;
a system driving unit transmitting a result data between the display device and the control center;
a first display unit displaying a TW target luminance, a TW target chromaticity and an RGB inherent chromaticity registered for the null setting step and the automatic setting step, a graph of a gray level voltage and a luminance of an RGB and a TW with respect to a gray level, a high level cell driving voltage (PVDD) and a low level cell driving voltage (PVEE) applied to an emitting element, a high level gamma source voltage (VDDH) and a low level gamma source voltage (VDDL) applied to a driving IC, a gamma slope, a contrast ratio, a driving type of the system, a gamma setting, an instruction on an execution command, and a progress state of the display device,
wherein the control center:
in the null setting step, calculates a contribution of a PW luminance to a TW luminance according to a ratio of the PW luminance to a W luminance (PW:W ratio) by measuring an RGBW luminance, the PW luminance and the TW luminance of all gray levels of the display device, calculates an IR drop PW luminance and an IR drop RGB luminance based on a voltage drop due to a driving resistance of the display device, calculates an RGB efficiency of all gray levels from the IR drop RGB luminance, calculates an RGB target luminance from the TW target luminance, the TW target chromaticity, the RGB inherent chromaticity and the PW:W ratio through a tri-stimulus value calculation, and generates a null code including a null gamma register from the RGB efficiency of all gray levels through a transfer function calculation; and
in the automatic setting step, calculates the RGB efficiency of at least two gray levels from the RGBW luminance, the PW luminance and the TW luminance of the at least two gray levels of the display device, calculates the RGB efficiency of gray levels other than the at least two gray levels in reference to a lookup table, and generates an automatic code including an automatic gamma register from the RGB efficiency of the at least two gray levels and the RGB efficiency of the gray levels other than the at least two gray levels, and
wherein the system driving unit transmits an instruction on a command and an execution result between the control center and a peripheral device including the first display unit, a second display unit, a communicating unit, a process result storing unit, an operation controlling unit, a carrying unit, a defect managing unit, a power supplying unit, a current processing center and a sample supporting unit.

31. The gamma setting system of claim 30, wherein the control center, in the null setting step, calculates the IR drop PW luminance using the W luminance, the PW luminance and the TW luminance, and calculates the IR drop RGB luminance using the RGB luminance, the PW luminance and the IR drop PW luminance.

32. The gamma setting system of claim 31, wherein the control center, in the tri-stimulus value calculation, calculates a virtual TW RGB luminance from the TW luminance, the TW chromaticity and the RGB inherent chromaticity, calculates a virtual W RGB luminance from W luminance, a W chromaticity and the RGB inherent chromaticity, and calculates the RGB target luminance by subtracting the W RGB luminance from the TW RGB luminance.

33. The gamma setting method of claim 32, wherein, in the tri-stimulus value calculation, a virtual TW RGB luminance is calculated from the TW luminance, the TW chromaticity and the RGB inherent chromaticity, a virtual W RGB luminance is calculated from W luminance, a W chromaticity and the RGB inherent chromaticity, and the RGB target luminance is calculated by subtracting the W RGB luminance from the TW RGB luminance.

34. A gamma setting method for a display device, in which a gamma setting system for a display device performs a null setting step setting a null gamma register of the whole gray levels of the display device from RGB luminance and TW luminance of the whole gray levels as an input condition and an automatic setting step setting an automatic gamma register of the whole gray levels of the display device from a lookup table and RGB luminance and TW luminance of at least two gray levels of the display device as an input condition, the method, comprising:
  registering a TW target luminance, a TW target chromaticity and an RGB inherent chromaticity to a gamma setting system;
  displaying the TW target luminance, the TW target chromaticity and the RGB inherent chromaticity, a graph of a gray level voltage and a luminance of an RGBW with respect to a gray level, a high level cell driving voltage (PVDD) and a low level cell driving voltage (PVEE) applied to an emitting element, a high level gamma source voltage (VDDH) and a low level gamma source voltage (VDDL) applied to a driving IC, a gamma slope, a contrast ratio, a driving type of the system, a gamma setting, an instruction on an execution command, and a progress state of the display device;
  measuring an optical property of all gray levels of a display device including an emissive display panel having red, green and blue sub-pixels;
  performing a null setting step which calculates an IR drop RGB luminance based on a voltage drop due to a driving resistance of the display device from an RGB luminance and a TW luminance of all gray levels of the display device, calculates an RGB efficiency of all gray levels from the IR drop RGB luminance, calculates an RGB target luminance from the TW target luminance, the TW target chromaticity and the RGB inherent chromaticity through a tri-stimulus value calculation, and generates a null code including a null gamma register from the RGB efficiency of all gray levels through a transfer function calculation;
  performing an automatic setting step which calculates the RGB efficiency of at least two gray levels from the RGB luminance and the TW luminance of the at least two gray levels of the display device, calculates the RGB efficiency of gray levels other than the at least two gray levels in reference to a lookup table, and generates an automatic code including an automatic gamma register from the RGB efficiency of the at least two gray levels and the RGB efficiency of the gray levels other than the at least two gray levels; and
  transmitting an instruction on a command and an execution result between a control center and a peripheral device including a first display unit, a second display unit, a communicating unit, a process result storing unit, an operation controlling unit, a carrying unit, a defect managing unit, a power supplying unit, a current processing center and a sample supporting unit by a control center.

35. The gamma setting method of claim 34, wherein one of the null setting step and the automatic setting step is selectively performed, or both of the null setting step and the automatic setting step are performed,
  wherein when both of the null setting step and the automatic setting step are performed, the automatic setting step is performs after the null setting step is performed,
  wherein the null setting step and the automatic setting step is performed using the RGB luminance and the TW luminance by a direct measurement of the optical measuring unit with respect to an identical input gamma power,
  wherein when the null setting step is repeatedly performed under an identical condition, the lookup table is updated, and
wherein when the automatic setting step is performed, a histogram is updated for the display device judged as a normality.

36. The gamma setting method of claim 34, wherein, in the null setting step, generating the null code by a measurement of a luminance and a chromaticity of all gray levels of the display device,
  wherein, in the automatic setting step, generating the automatic code by a measurement of a luminance and a chromaticity of at least two gray levels of the display device, and
  wherein a sequential procedure is performed without a re-performance due to a feedback by ending all processes for a gamma setting with judging a normality or an abnormality of the display device.

37. The gamma setting method of claim 34, wherein the null setting step and the automatic setting step are performed using an initial value, an equivalent resistance structure of a driving IC of the display device and an initial code,
  wherein the initial value includes a gamma voltage, a driving voltage of the emissive display panel, the TW target luminance, the TW target chromaticity, the gamma slope, the contrast ratio, the RGB inherent chromaticity and an emission type of the display device,
  wherein the equivalent resistance structure of the driving IC equivalently includes a structure and a resistance of a ladder resistor of a gray level voltage generating unit of the driving IC for calculating a gamma register from the gamma voltage calculated through the transfer function calculation, and
  wherein the initial code includes a resolution, a driving signal and a driving condition where an operation setting of the driving IC is defined and an initial gamma register.

38. The gamma setting method of claim 34, wherein the null code calculated through the null setting step for the automatic setting step is utilized, or the null code calculated through the null setting step is stored in the display device,
  wherein a lookup table data and a histogram data are calculated through the null setting step, and wherein the lookup table is updated by repeatedly performing the null setting step regularly or irregularly under an identical environment.

39. The gamma setting method of claim 34, wherein the automatic setting comprises:
    calculating a critical point efficiency by calculating a critical point luminance from a measured maximum point luminance of the display device and the registered contrast ratio, or calculating the critical point efficiency by directly measuring the critical point luminance;
    selecting an inflection point in reference to a histogram, or selecting a local maximum of an efficiency variation rate corresponding to a luminance smaller than 2 cd/m$^2$ as the inflection point; and
    obtaining a total efficiency relation with the critical point efficiency by calculating an inflection point efficiency and a maximum point efficiency from a measured inflection point luminance and the measured maximum point luminance.

40. The gamma setting method of claim 34, further comprising:
    calculating a gamma voltage of the RGB target luminance due to the RGB efficiency after the null setting step and the automatic setting step are performed;
    calculating an input voltage of all gray levels by applying the RGB efficiency to the RGB target luminance through the transfer function calculation after a structure of a ladder resistor is equivalently registered to a transfer function at an initial stage; and
    calculating the null code and the automatic code including the null gamma register and the automatic gamma register after setting a value of the ladder resistor satisfying the input voltage as the null gamma register and the automatic gamma register.

41. The gamma setting method of claim 34, further comprising:
    judging the display device as a normality or an abnormality according to the null code or the automatic code after the null setting step or the automatic setting step is performed;
    classifying the display device according to a judgment result of the normality or the abnormality, or classifying the display device according to an identification code after the display device is judged, or after a gamma setting of the display device is completed;
    updating a histogram using an information of an inflection point of the display device of the normality; and
    storing the null code or the automatic code in a driving IC of the display device of the normality.

42. The gamma setting method of claim 34, further comprising:
    directly measuring an input current consumption and an output photo current of the display device;
    proportionally calculating the RGB efficiency of all gray levels using a correlation of the input current consumption and the output photo current; and
    modifying a deviation using the current consumption detected from a power supplied to the display device and the photo current corresponding to a luminance of a light emitted from the display device.

43. The gamma setting method of claim 34, wherein an aging step is performed before the null setting step and the automatic setting step, and
    wherein the null setting step and the automatic setting step are performed by commonly using a signal supplying line and a jig of the aging step.

44. The gamma setting method of claim 43, wherein the display device is disposed on and fixed to the sample supporting unit during the aging step,
    wherein the display device is disposed on and fixed to the sample supporting unit during the null setting step and the automatic setting step, and
    wherein a system for performing the null setting step and the automatic setting step is disposed in a system for performing the aging step.

45. The gamma setting method of claim 34, wherein the emissive display panel is divided into a plurality of blocks,
    wherein the display device further comprises a plurality of driving ICs supplying a data signal to the plurality of blocks, respectively, and
    wherein, in the null setting step and the automatic setting step, the null code and the automatic code are generated using a different transfer function for the plurality of blocks, and the null code and the automatic code are applied to the plurality of driving ICs.

46. The gamma setting method of claim 45, wherein the plurality of blocks are a plurality of areas of the emissive display panel corresponding to the plurality of driving ICs, respectively.

47. The gamma setting method of claim 45, wherein when a gamma setting for the plurality of blocks of the display device is simultaneously performed, the first display unit displays a setting state and a progress state of the plurality of blocks, and a plurality of optical measuring units, a plurality of control centers and a plurality of system driving units perform the gamma setting for the plurality of blocks.

48. A gamma setting method for a display device, comprising:
    registering a TW target luminance, a TW target chromaticity and an RGB inherent chromaticity to a gamma setting system;
    displaying the TW target luminance, the TW target chromaticity and the RGB inherent chromaticity, a graph of a gray level voltage and a luminance of an RGB and a TW with respect to a gray level, a high level cell driving voltage (PVDD) and a low level cell driving voltage (PVEE) applied to an emitting element, a high level gamma source voltage (VDDH) and a low level gamma source voltage (VDDL) applied to a driving IC, a gamma slope, a contrast ratio, a driving type of the system, a gamma setting, an instruction on an execution command, and a progress state of the display device;
    measuring an optical property of a display device including an emissive display panel having red, green and blue sub-pixels;
    performing a null setting step which calculates a contribution of a PW luminance to a TW luminance according to a ratio of the PW luminance to a W luminance (PW:W ratio) from an RGBW luminance, the PW luminance and the TW luminance of all gray levels of the display device, calculates an IR drop PW luminance and an IR drop RGB luminance based on a voltage drop due to a driving resistance of the display device, calculates an RGB efficiency of all gray levels from the IR drop RGB luminance, calculates an RGB target luminance from the TW target luminance, the TW target chromaticity, the RGB inherent chromaticity and the PW:W ratio through a tri-stimulus value calculation, and generates a null code including a null gamma register from the RGB efficiency of all gray levels through a transfer function calculation;
    performing an automatic setting step which calculates the RGB efficiency of at least two gray levels from the RGBW luminance, the PW luminance and the TW luminance of the at least two gray levels of the display device, calculates the RGB efficiency of gray levels other than the at least two gray levels in reference to a lookup table, and generates an automatic code including an automatic gamma register from the RGB efficiency of the at least two gray levels and the RGB efficiency of the gray levels other than the at least two gray levels; and transmitting an instruction on a command and an execution result between a control center and a peripheral device including a first display unit, a second display unit, a communicating unit, a process result storing unit, an operation controlling unit, a carrying unit, a defect managing unit, a power supplying unit, a current processing center and a sample supporting unit.

49. The gamma setting method of claim 48, wherein, in the null setting step, the IR drop PW luminance is calculated using the W luminance, the PW luminance and the TW luminance, and the IR drop RGB luminance is calculated using the RGB luminance, the PW luminance and the IR drop PW luminance.

\* \* \* \* \*